(12) United States Patent
Mitsui et al.

(10) Patent No.: US 11,559,001 B2
(45) Date of Patent: Jan. 24, 2023

(54) COMBINE HARVESTER FRAME ARRANGEMENT

(71) Applicant: Kubota Corporation, Osaka (JP)

(72) Inventors: Takafumi Mitsui, Sakai (JP); Mamoru Shinya, Sakai (JP); Hiroaki Matsushita, Sakai (JP); Takahiro Uchi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/757,857

(22) PCT Filed: Oct. 25, 2017

(86) PCT No.: PCT/JP2017/038544
§ 371 (c)(1),
(2) Date: Apr. 21, 2020

(87) PCT Pub. No.: WO2019/082305
PCT Pub. Date: May 2, 2019

(65) Prior Publication Data
US 2021/0185931 A1      Jun. 24, 2021

(51) Int. Cl.
*A01F 12/18*         (2006.01)
*A01D 67/00*         (2006.01)
*A01D 69/00*         (2006.01)
*A01F 12/60*         (2006.01)

(52) U.S. Cl.
CPC ............ *A01F 12/181* (2013.01); *A01D 67/00* (2013.01); *A01D 69/00* (2013.01); *A01F 12/60* (2013.01)

(58) Field of Classification Search
CPC ....... A01F 12/181; A01F 12/60; A01D 67/00; A01D 69/00; A01B 51/00
See application file for complete search history.

(56) References Cited

U.S. PATENT DOCUMENTS

| | | | |
|---|---|---|---|
| 3,848,609 A | 11/1974 | Mortier et al. | |
| 4,150,525 A | 4/1979 | De Busscher et al. | |
| 4,231,431 A * | 11/1980 | Weichel | A01B 51/026 171/46 |
| 4,846,198 A | 7/1989 | Carnewal et al. | |

(Continued)

FOREIGN PATENT DOCUMENTS

| CN | 104066315 A | 9/2014 |
|---|---|---|
| EP | 0250654 A1 | 1/1988 |

(Continued)

*Primary Examiner* — Alicia Torres
(74) *Attorney, Agent, or Firm* — The Webb Law Firm

(57) ABSTRACT

A combine harvester is provided with left and right main frames that extend in the front-rear direction of a vehicle body, and a threshing device installed between the left and right main frames. The threshing device is provided with a threshing unit that performs a grain removal process, and a sorting unit that is provided below the threshing unit and performs a sorting process of sorting processed articles after the grain removal process has been performed by the threshing unit. A threshing frame included in the threshing unit is mounted on and supported by the left and right main frames, and a sorting unit frame included in the sorting unit is suspended from and supported by the left and right main frames.

19 Claims, 20 Drawing Sheets

(56) References Cited

U.S. PATENT DOCUMENTS

| | | | | |
|---|---|---|---|---|
| 5,024,630 | A * | 6/1991 | Harig | A01D 41/12 |
| | | | | 460/119 |
| 5,290,201 | A * | 3/1994 | Tesker | B60K 17/105 |
| | | | | 180/24.11 |
| 5,437,145 | A * | 8/1995 | Farley | F16C 11/045 |
| | | | | 403/14 |
| 5,475,972 | A * | 12/1995 | McConnell | A01D 46/08 |
| | | | | 460/119 |
| 5,499,948 | A * | 3/1996 | Underwood | A01D 67/00 |
| | | | | 460/119 |
| 6,267,198 | B1 * | 7/2001 | Hurlburt | B62D 7/18 |
| | | | | 180/414 |
| 6,421,993 | B1 * | 7/2002 | Mackin | A01D 61/008 |
| | | | | 56/219 |
| 7,670,219 | B2 * | 3/2010 | Matousek | A01F 12/444 |
| | | | | 460/100 |
| 10,375,884 | B2 * | 8/2019 | Claerhout | A01F 7/067 |
| 2018/0007832 | A1 * | 1/2018 | Matousek | A01D 41/16 |
| 2019/0254220 | A1 * | 8/2019 | Bertino | A01D 41/1217 |

FOREIGN PATENT DOCUMENTS

| | | | |
|---|---|---|---|
| JP | 2010187696 | A | 9/2010 |
| JP | 201414323 | A | 1/2014 |
| JP | 2015142514 | A | 8/2015 |
| JP | 201649093 | A | 4/2016 |
| JP | 2017121224 | A | 7/2017 |

\* cited by examiner

COMBINE HARVESTER FRAME ARRANGEMENT

CROSS-REFERENCE TO RELATED APPLICATION

This application is the United States national phase of International Application No. PCT/JP2017/038544 filed Oct. 25, 2017, the disclosures of which is hereby incorporated by reference in its entirety.

TECHNICAL FIELD

The present invention relates to a combine harvester configured to reap planted grain culm while traveling, and thresh the reaped grain culm with a threshing device.

BACKGROUND ART

The threshing device is provided with a threshing unit that performs a threshing process and a sorting unit that performs a sorting process of sorting processed articles after the threshing process is performed by the threshing unit, in a state arranged in the vertical direction. Conventionally, the threshing unit and the sorting unit are integrally housed in a substantially box-shaped case, and the entire threshing device is mounted on and supported by a main frame provided in a lower portion of a vehicle body (for example, see Patent Document 1).

PRIOR ART DOCUMENTS

Patent Documents

Patent Document 1: JP 2014-14323A

DISCLOSURE OF THE INVENTION

Problems to be Solved by the Invention

In the above conventional configuration, the threshing unit and the sorting unit are provided in a state arranged in the vertical direction within the case, so the threshing device as a whole is large, and this has the disadvantage that it is difficult to perform assembly work when assembling the threshing device in the vehicle body.

Recently, in combine harvesters, there has been a demand to improve processing capacity, and it is necessary to further increase the size of the threshing device as the processing capacity is improved. However, in the above-described conventional configuration, when attempting to increase the size of the threshing device, the outer shape is increased and the weight is further increased, and this may make it difficult to perform assembly work.

Moreover, in the above-described conventional configuration, when attempting to improve the performance of the threshing device, the threshing device becomes tall in the vertical direction. As a result, there are also the disadvantages that the vertical height of the vehicle body becomes large and the position of the center of gravity becomes high, so traveling stability worsens.

Consequently, it is desired to realize a combine harvester in which the vertical height of the vehicle body is suppressed, and in which it is easy to perform the work of assembling the threshing device.

Means for Solving Problems

In a characteristic configuration of a combine harvester according to the present invention, the combine harvester includes:

left and right main frames that extend in the front-rear direction of a vehicle body, and a threshing device installed between the left and right main frames, wherein the threshing device is provided with a threshing unit that performs a grain removal process, and a sorting unit that is provided below the threshing unit and performs a sorting process of sorting processed articles after the grain removal process has been performed by the threshing unit, a threshing frame included in the threshing unit is mounted on and supported by the left and right main frames, and a sorting unit frame included in the sorting unit is suspended from and supported by the left and right main frames.

According to this configuration, the threshing unit and the sorting unit are configured separately from each other by frames separate from each other, specifically the threshing frame and sorting unit frame. The threshing frame is positioned above the left and right main frames, and is mounted on and supported by the left and right main frames. The sorting unit frame is positioned below the left and right main frames, and is suspended from and supported by the left and right main frames.

Since the threshing unit and the sorting unit are configured separately, when the threshing device is assembled to the vehicle body, the threshing unit and the sorting unit can each be separately attached to the main frames. Therefore, compared to a case of attaching the entire threshing device all at once, the device to be attached has a smaller external shape and less weight, so it is easier to perform the assembly work.

Since the sorting unit frame is positioned below the main frames, and is suspended from and supported by the main frames, the threshing device as a whole is in a state lowered below the main frames. As a result, even if the size of the threshing device is increased and the threshing device itself becomes taller in the vertical direction, since the sorting unit is positioned below the main frames, it is possible to avoid increasing the vertical height of the vehicle body as a whole.

Consequently, it is possible to realize a combine harvester in which the vertical height of the vehicle body is suppressed, and in which it is easy to perform the work of assembling the threshing device.

In the present invention, it is suitable that:

traveling units are provided on both left and right sides of the vehicle body, an axle of the traveling units is provided at a position lower than the left and right main frames, the left and right traveling units are provided in a state positioned outside in the left-right direction of the vehicle body with respect to the left and right main frames, and the left and right main frames are supported by the left and right traveling units.

According to this configuration, the left and right traveling units have an axle lower than the left and right main frames, and also are positioned outside in the left-right direction of the vehicle body with respect to the main frames, so the left and right traveling units are disposed with a large gap between them in the left-right direction, and are positioned lower than the main frames, so it is possible to stably support the entire vehicle body.

In the present invention, it is suitable that the combine harvester includes a traveling unit connecting body that connects the left and right traveling units.

According to this configuration, the left and right traveling units are configured to be connected by the traveling unit connecting body, so the rigidity of the support structure of the left and right traveling units is increased, and therefore the left and right traveling units can be firmly supported.

In the present invention, it is suitable that the combine harvester includes:

a fuel tank support frame that connects both left and right side portions of a lower portion of the sorting unit frame, and protrudes outward to one side in the left-right direction of the vehicle body with respect to the main frame on one side in the left-right direction of the vehicle body among the left and right main frames, wherein a fuel tank is mounted on and supported by the fuel tank support frame.

According to this configuration, the tank support frame is provided in a state connecting both left and right side portions of the lower portion of the sorting unit frame and extending in the left-right direction. The tank support frame protrudes outward to one side in the left-right direction of the vehicle body with respect to the main frame, and the fuel tank is mounted on and supported at the protruding location. In this way, the sorting unit frame having high rigidity in order to configure the sorting unit is effectively used, and the fuel tank support frame is stably and firmly supported. Therefore, it is possible to support the fuel tank to the outside on one side in the left-right direction of the vehicle body with respect to the main frames, without interfering with the main frames.

In the present invention, it is suitable that:

a driving portion is provided in front of the threshing unit, left and right vertically oriented frame bodies are provided on both left and right sides in a front end portion of the threshing frame, a driving portion frame is provided in a state protruding forward in the vehicle body from the left and right vertically oriented frame bodies, and the driving portion is mounted on and supported by the driving portion frame.

According to this configuration, a cabin frame is provided in a state protruding forward in the vehicle body from the left and right vertically oriented frame bodies in the threshing frame, and a cabin is mounted on and supported by the cabin frame. Therefore, for example, without extending a long support member or the like from the main frames, the cabin can be supported by effectively using the threshing frame having high rigidity in order to configure the threshing unit.

In the present invention, it is suitable that:

in the front portion of the vehicle body, there is provided a reaping transport unit that reaps planted grain culm and transports reaped grain culm to the threshing device, left and right vertically oriented frame bodies are provided on both left and right sides in a front end portion of the threshing frame, and a base end portion of the reaping transport unit is supported across an upper face of a forward protruding portion that protrudes forward with respect to the left and right vertically oriented frame bodies among the left and right main frames, and a front face of the vertically oriented frame bodies.

According to this configuration, the base end portion of the reaping transport unit is supported by using a corner portion formed by the forward protruding portion that protrudes forward from the left and right main frames and the vertically oriented frame bodies in the threshing frame.

Therefore, by using the configuration of the threshing frame, it is possible to support the base end portion of the reaping transport unit, and to stably support the base end portion, without complicating the structure by separately providing a special rotation fulcrum or the like.

In the present invention, it is suitable that:

traveling units are provided on both left and right sides of the vehicle body, a front side traveling device and a rear side traveling device are provided in the left and right traveling units, and a front portion of the left and right main frames is supported by the front side traveling device and a rear portion of the left and right main frames is supported by the rear side traveling device.

According to this configuration, the front side of the vehicle body is supported through the left and right main frames by both left and right front side traveling devices, and the rear side of the vehicle body is supported through the left and right main frames by both left and right rear side traveling devices. Therefore, the entire vehicle body is stably supported by the four traveling devices positioned on both front and rear sides on the left and right, respectively.

In the present invention, it is suitable that the combine harvester includes a front side connection portion that connects a front portion of the left and right main frames, and a rear side connection portion that connects a rear portion of the left and right main frames.

According to this configuration, the left and right main frames are connected on the front side by the front side connection portion, and are connected on the rear side by the rear side connection portion. Therefore, since the connection is formed in a rectangular frame shape, the rigidity of the vehicle body as a whole can be increased, and the entire vehicle body can be firmly supported.

In the present invention, it is suitable that the front side connection portion is provided on a forward side of the sorting unit, and the rear side connection portion is provided on a rearward side of the sorting unit.

According to this configuration, the front side connection portion and the rear side connection portion can satisfactorily connect the left and right main frames at an appropriate position that does not interfere with the sorting unit.

In the present invention, it is suitable that a front end portion of the sorting unit frame is connected to the front side connection portion.

According to this configuration, the rigidity of the vehicle body support structure can be further increased by connecting the front end portion of the sorting unit frame and the front side connection portion.

In the present invention, it is suitable that the front side connection portion is provided with base portions provided in a front portion of the left and right main frames, an upper lateral frame configured to connect the left and right base portions, and a lower lateral frame configured to connect the left and right base portions on the lower side with respect to the left and right base portions, with a lower portion of the left and right base portions being supported on the left and right front side traveling devices.

According to this configuration, since both left and right sides of the front side connection portion are connected to each other by the upper lateral frame and the lower lateral frame, the left and right main frames can be firmly connected on both the upper and lower sides. Since the lower portion of the forward protruding portion is supported by the front side traveling device, the processing time is reduced in comparison to a configuration in which the main frame, which is a large member, is directly supported by the front side traveling device.

In the present invention, it is suitable that:

the vehicle body front portion is provided with a reaping transport unit that reaps planted grain culm and transports reaped grain culm to the threshing device, the lower lateral frame is provided with left and right front-rear oriented connecting bodies that are connected to both left and right side portions of a front end portion of the sorting unit frame and extend forward in a front-rear direction, a rear side laterally oriented connecting body configured to connect a rear portion of the left and right front-rear oriented connecting bodies, and a front side laterally oriented connecting body configured to connect a front portion of the left and right front-rear oriented connecting bodies, and an actuator capable of raising/lowering the reaping transport unit is supported on the front side laterally oriented connecting body.

According to this configuration, the lower lateral frame is configured in a substantially rectangular frame shape by connecting the left and right front-rear connection bodies, the rear side laterally oriented connecting body, and the front side laterally oriented connecting body to each other. Therefore, it is possible to increase the rigidity of the lower lateral frame, and it is possible to increase the support strength using not only the main frames, but also the sorting frame, which is a main frame member.

In the present invention, it is suitable that a transmission case equipped with a transmission mechanism for driving travel is provided in a state in which the transmission case enters between the upper lateral frame and the lower lateral frame.

According to this configuration, since both upper and lower sides of the transmission case are surrounded by the upper lateral frame and the lower lateral frame, it is possible to prevent interference by external obstacles.

In the present invention, it is suitable that:

axle cases of the left and right front side traveling devices, and left and right relay transmission cases configured to connect the transmission case with the left and right axle cases, are provided on left and right sides of the transmission case, and the left and right axle cases are configured to be respectively connected to the left and right base portions and are connected to the lower lateral frame.

According to this configuration, the power from the transmission case is transmitted to the left and right front side traveling devices through the transmission shafts in the left and right axle cases and the transmission mechanisms in the left and right relay transmission cases. The left and right axle cases are firmly supported by the main frames through the forward protruding portion in a state connected by the lower lateral frame to increase rigidity.

In the present invention, it is suitable that:

the rear side connection portion is provided with a rear connecting body that is positioned on the lower side with respect to the left and right main frames and extends across the left and right main frames, and a traveling device support body provided across the left and right rear side traveling devices is supported by the rear connecting body so as to be swingable around a front-rear axis.

According to this configuration, on the rear side, the traveling device support body can be supported by the rear connecting body that extends across the left and right main frames and is firmly supported. Since the traveling device support body that supports the left and right rear side traveling devices is supported by the rear connecting body so as to be swingable around a front-rear axis, the left and right rear side traveling devices can move by rolling left and right while following unevenness of the ground.

In the present invention, it is suitable that the combine harvester includes:

a grain tank that stores grain after the grain removal process in the threshing device, and an engine serving as a power source, wherein above the threshing device, in a state where the grain tank is positioned on the front side of the vehicle body and the engine is positioned on the rear side of the vehicle body, the grain tank and the engine are provided in a state lined up in the front-rear direction, and the grain tank and the engine are supported by left and right vertically oriented support portions erected from the left and right main frames in a state where the grain tank and the engine are provided widely in the front-rear direction of the vehicle body.

According to this configuration, since the grain tank and the engine are arranged using the area above the threshing device, for example, even in a case where the threshing device is large in order to increase the capacity of the threshing device, compared to a case where the engine is provided on the lateral side of the threshing device or the engine is provided on the lateral side of the grain tank, the engine can be rationally arranged without increasing the lateral dimensions of the vehicle body. Moreover, the grain tank and the engine can be stably supported by the left and right vertically oriented support portions provided over a wide range in the front-rear direction of the vehicle body.

In the present invention, it is suitable that the combine harvester includes a threshing upper connecting body that connects an upper portion of the left and right vertically oriented support portions, wherein the threshing upper connecting body is connected to a top plate of the threshing device.

According to this configuration, the upper portion of the left and right vertically oriented support portions, the threshing upper connecting body, and the top plate of the threshing device respectively are connected to each other, and moreover, the lower portion of the left and right vertically oriented support portions are connected to the left and right main frames, so they can form a firm support structure with high rigidity in a framework state.

In the present invention, it is suitable that the combine harvester includes:

a grain tank support frame that supports the grain tank, and an engine support frame that supports the engine, wherein the grain tank support frame and the engine support frame extend across the left and right vertically oriented support portions, and are respectively supported by the left and right vertically oriented support portions.

According to this configuration, the grain tank is stably supported by the grain tank support frame, and the engine is stably supported by the engine support frame. In addition, the grain tank support frame and the engine support frame are supported by the left and right vertically oriented support portions, respectively, so a rigid and firm support structure can be formed using the grain tank support frame and the engine support frame.

In the present invention, it is suitable that:

an engine serving as a power source, a radiator for engine cooling, and an exhaust treatment device that treats exhaust from the engine are provided in a state positioned above the threshing device, when viewed in the front-rear direction of the vehicle body, the exhaust treatment device and the radiator are disposed separately on the left and right sides with respect to the engine, and the radiator is provided in a state protruding outward to one side in the left-right direction with respect to an end portion on one side in the left-right direction of the threshing device, the exhaust treatment device is supported by the engine, and the radiator is supported by the threshing device.

According to this configuration, the exhaust treatment device and the radiator do not protrude upward with respect to the engine, and therefore the engine, the exhaust treatment device, and the radiator can be arranged in a state where the engine, the exhaust treatment device, and the radiator are compactly housed in the vertical direction.

Since the exhaust treatment device processes high-temperature exhaust gas, it is supported by the engine. The radiator is connected to the engine only through a cooling water circulation path, and moreover, the temperature of the radiator does not become high as in the location of exhaust gas flow, so the radiator is supported by the threshing device. In this way, the exhaust treatment device and the radiator can be appropriately arranged at a position near the engine.

BEST MODE FOR CARRYING OUT THE INVENTION

Below, with reference to the accompanying drawings, an example will be described in which an embodiment of a combine harvester according to the present invention is applied to an ordinary combine harvester.

Overall Configuration

Figure 1:
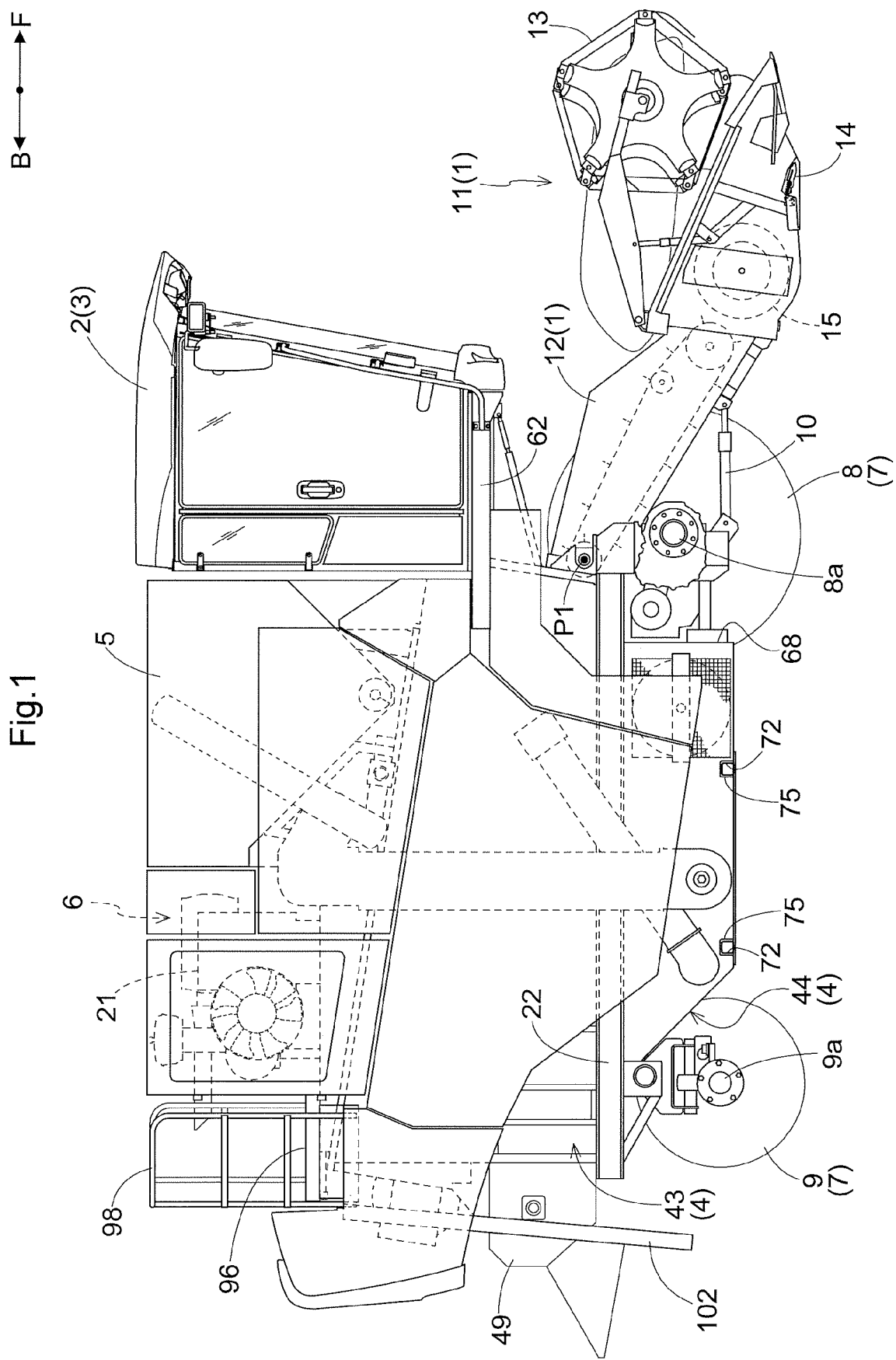
FIG. 1 is an overall right side view of a combine harvester.
Figure 2:
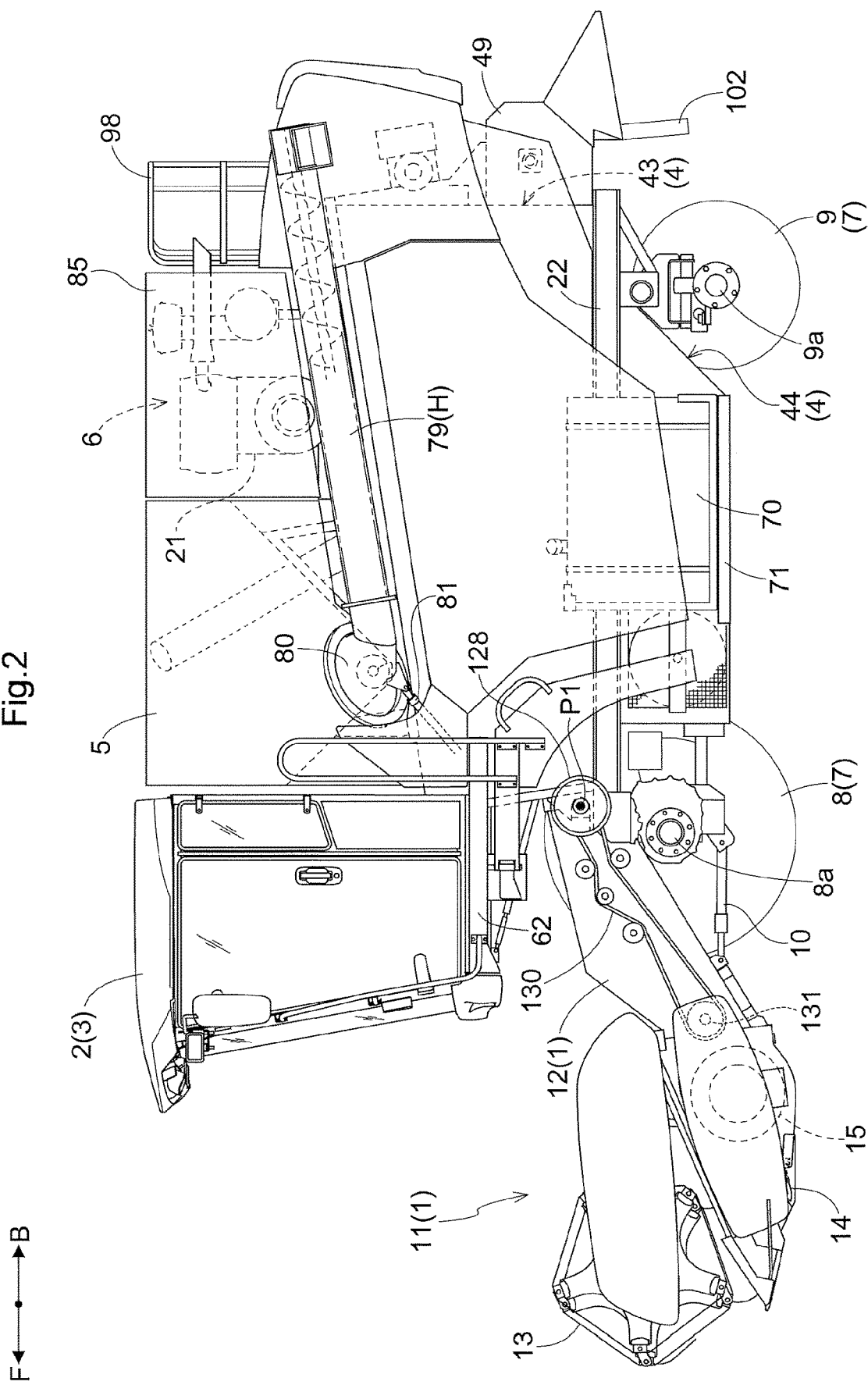
FIG. 2 is an overall left side view of the combine harvester.
Figure 3:
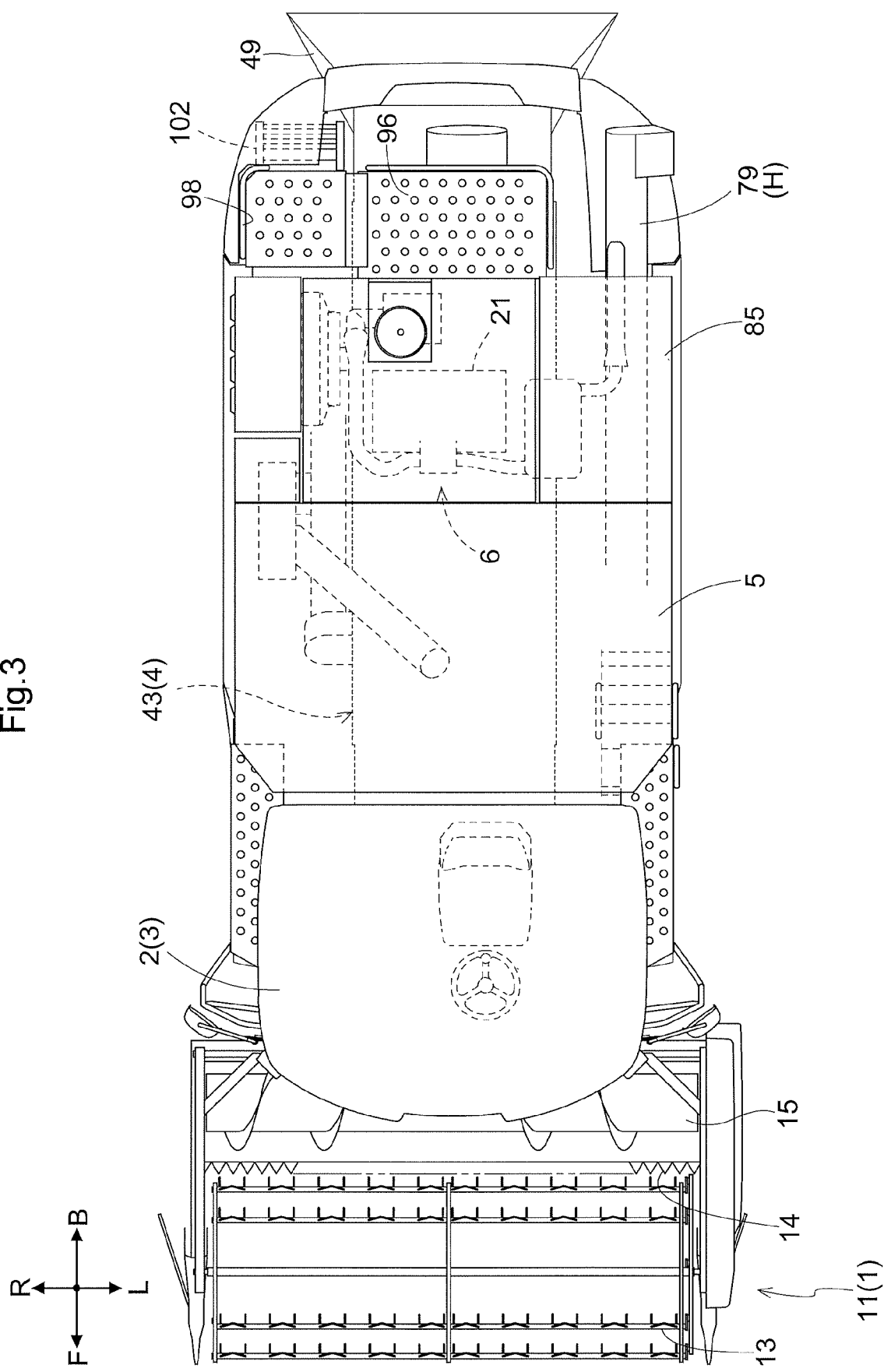
FIG. 3 is a plan view of the combine harvester.

As shown in FIGS. 1 to 3, the combine harvester is provided with a reaping transport unit 1 that reaps a crop and transports it rearward, a driving portion 3 covered with a cabin 2, a threshing device 4 that performs a threshing process of processing articles reaped by the reaping transport unit 1, a grain tank 5 that stores grain obtained by the threshing process by the threshing device 4, a motor 6 having an engine 21 as a power source, and left and right traveling units 7 positioned on both left and right sides of the vehicle body. Each of the left and right traveling units 7 includes a front wheel 8 as a front side traveling device that cannot be steered and is rotationally driven, and a rear wheel 9 as a rear side traveling device that can be steered.

In this embodiment, when defining the front-rear direction of the vehicle body, this direction is defined along the vehicle body traveling direction in a working state, and when defining the left-right direction of the vehicle body, left and right are defined as viewed from the vehicle body traveling direction. That is, the direction indicated by reference sign (F) in FIGS. 1, 2, and 3 is the front side of the vehicle body, the direction indicated by reference sign (B) in FIGS. 1, 2, and 3 is the rear side of the vehicle body, the direction indicated by reference sign (L) in FIG. 3 is the left side of the vehicle body, and the direction indicated by reference sign (R) in FIG. 3 is the right side of the vehicle body.

The reaping transport unit 1 is supported by a reaping elevating cylinder 10 as an elevating actuator at the front portion of the vehicle body so as to be able to be driven up and down around a laterally oriented fulcrum P1. The reaping transport unit 1 is provided with a reaping header 11 that reaps a crop to be planted and gathers the reaped crop in the center in a cutting width direction, and a feeder 12 that transports the reaped and centrally gathered crop to the threshing device 4 at the rear of the vehicle body.

As shown in FIGS. 1, 2, 3, and 20, the reaping header 11 has a rotating reel 13 that rakes the tip side of a crop to be reaped rearward, a clipper-type cutting blade 14 that cuts and reaps the root of the crop, and a lateral feed auger 15 that gathers the reaped crop toward the center in the cutting width direction, and the like.

Figure 20:
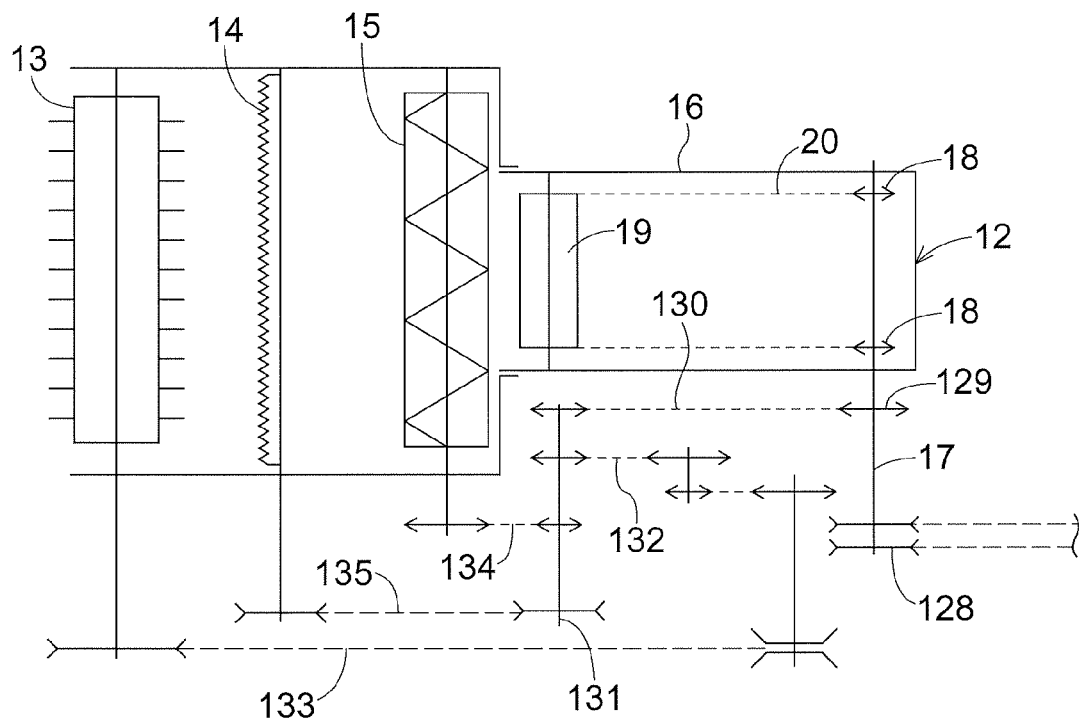
FIG. 20 is a transmission system diagram.

In the feeder 12, as shown in FIG. 20, in a rectangular cylindrical transport case 16, a pair of left and right endless rotating chains 20 are wound and stretched across a drive sprocket 18 provided on a reaping input shaft 17 positioned in a rear upper portion and a driven rotating body 19 positioned in a front lower portion. A locking carrier (not shown) is provided at an appropriate interval in the circumferential direction across the left and right endless rotating chains 20, and the endless rotating chains 20 are driven to rotate, and thus, the crop delivered from the reaping header 11 is transported upward and rearward by the locking carrier.

The threshing device 4 is located at a low position in the center of the vehicle body in the left-right direction, and in a state in which, above the threshing device 4, the grain tank 5 is located on the front side of the vehicle body and the engine 21 serving as a power source is located on the rear side of the vehicle body, the grain tank 5 and the engine 21 are provided lined up in the front-rear direction.

Vehicle Body Support Structure

Following is a description of the vehicle body support structure.

Figure 4:
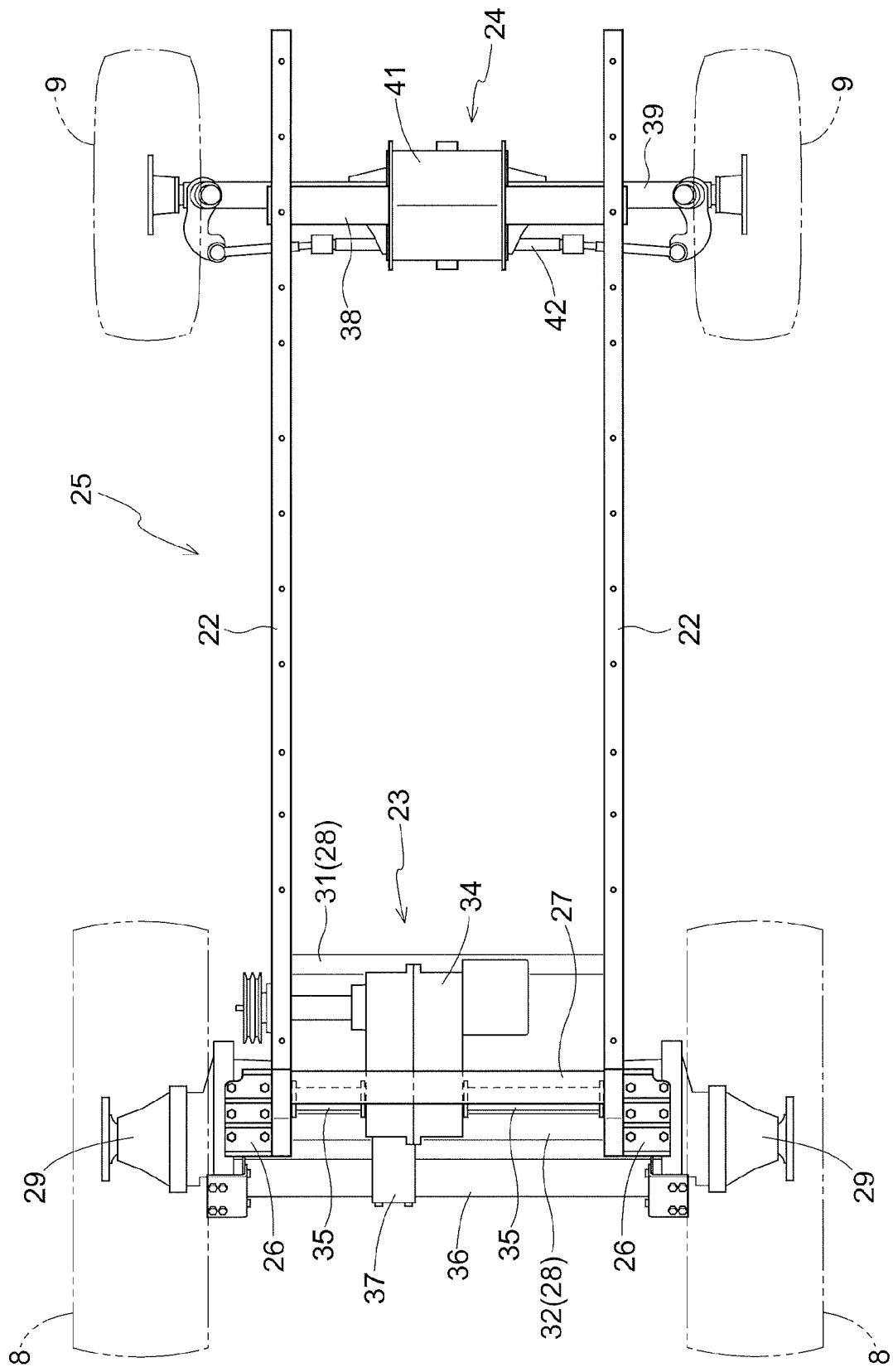
FIG. 4 is a plan view showing a vehicle body support structure.
Figure 5:
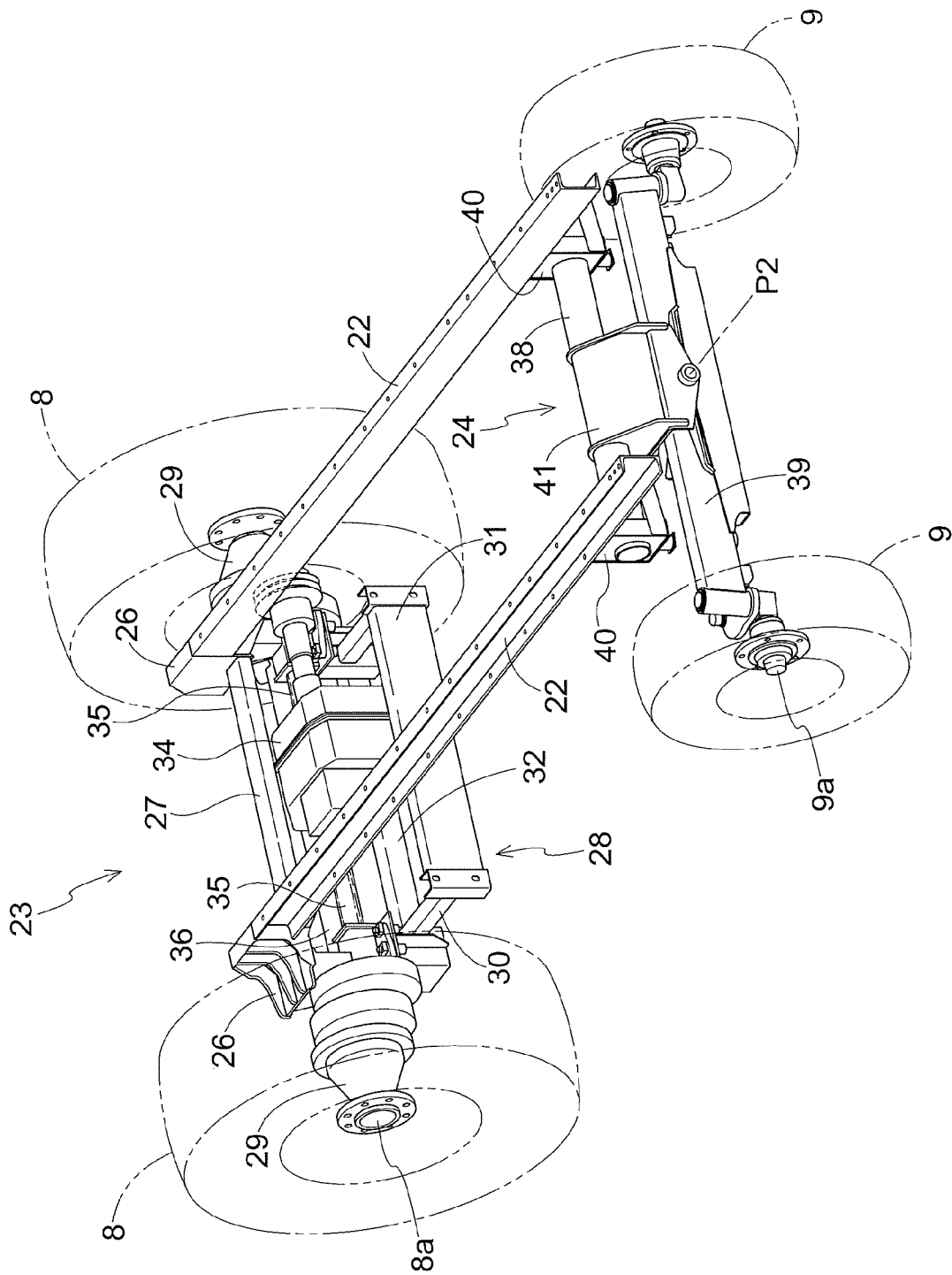
FIG. 5 is a perspective view showing the vehicle body support structure.

As shown in FIGS. 4 and 5, a vehicle body frame 25 that supports the entire vehicle body is configured by a pair of left and right main frames 22 extending in the front-rear direction of the vehicle body, a front side connection portion 23 connecting the front portion of the left and right main frames 22, and a rear side connection portion 24 that connects the rear portion of the left and right main frames 22.

The left and right main frames 22 are formed of a channel material having a substantially C-shaped cross-section, and as shown in FIGS. 1 and 2, are provided long in the front-rear direction from the vehicle body front portion to the vehicle body rear portion. The left and right traveling units 7, that is, the left and right front wheels 8 and axles 8a and 9a of the left and right rear wheels 9, are provided at a position lower than the left and right main frames 22. As shown in FIGS. 4 and 5, the left and right front wheels 8 and the left and right rear wheels 9 are provided in a state positioned on the outer side of the vehicle body in the left-right direction of each of the left and right main frames 22, and the left and right main frames 22 are supported by the left and right front wheels 8 and the left and right rear wheels 9.

Following is a description of the front side connection portion 23.

As shown in FIGS. 4 and 5, the front side connection portion 23 includes left and right base portions 26 corresponding to a forward protruding portion that protrudes forward from the left and right main frames 22, an upper lateral frame 27 that connects the left and right base portions 26, and a lower lateral frame 28 that connects both left and right side portions below the left and right base portions 26. The base portions 26 are integrally connected to the front end portion of the left and right main frames 22 in a state protruding forward. The upper lateral frame 27 has a rectangular cylindrical shape, extends across the left and right base portions 26, and both left and right sides of the upper lateral frame 27 are integrally connected to the base portions 26.

Figure 7:
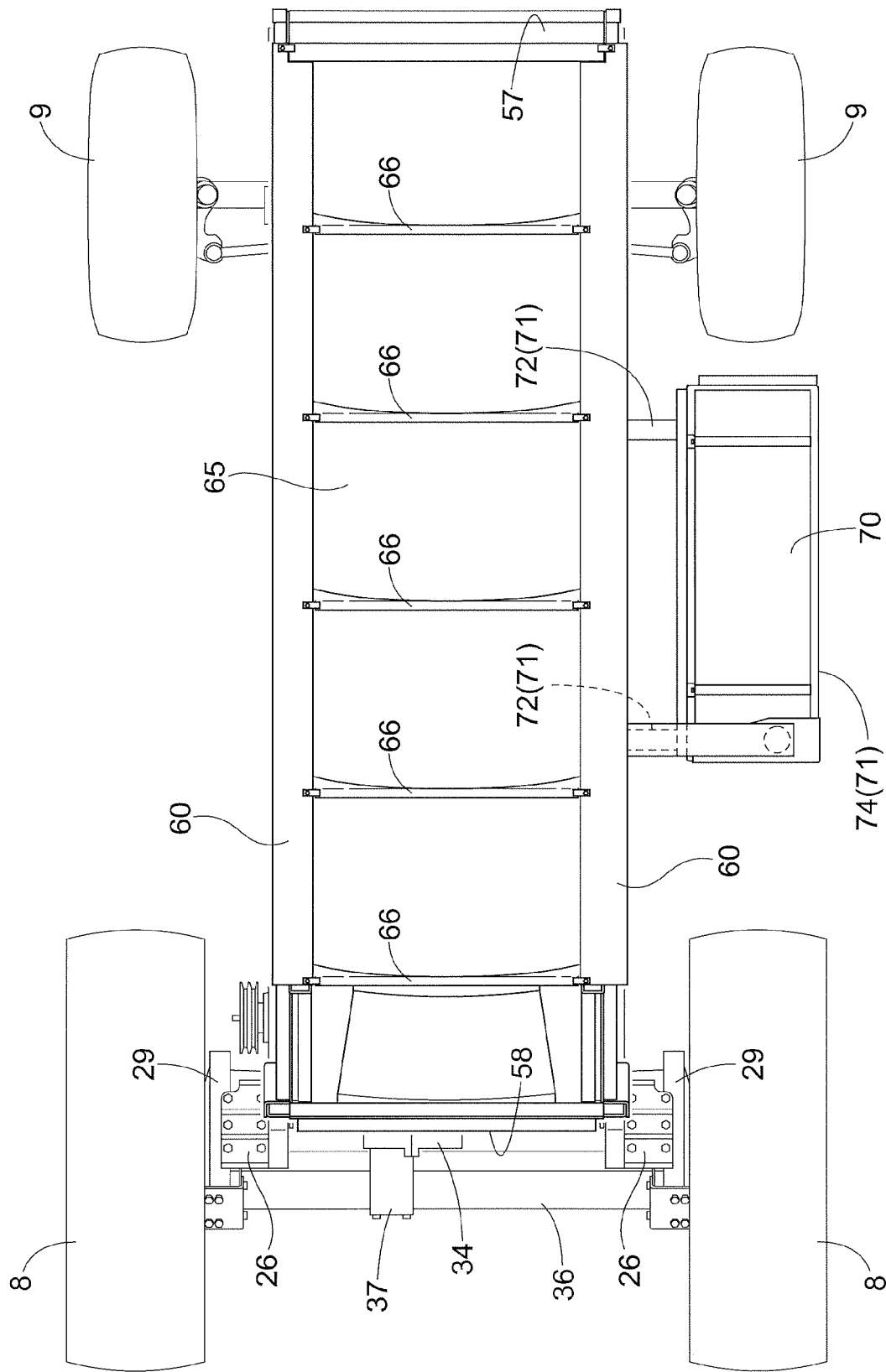
FIG. 7 is a plan view showing a support structure of the threshing device.
Figure 9:
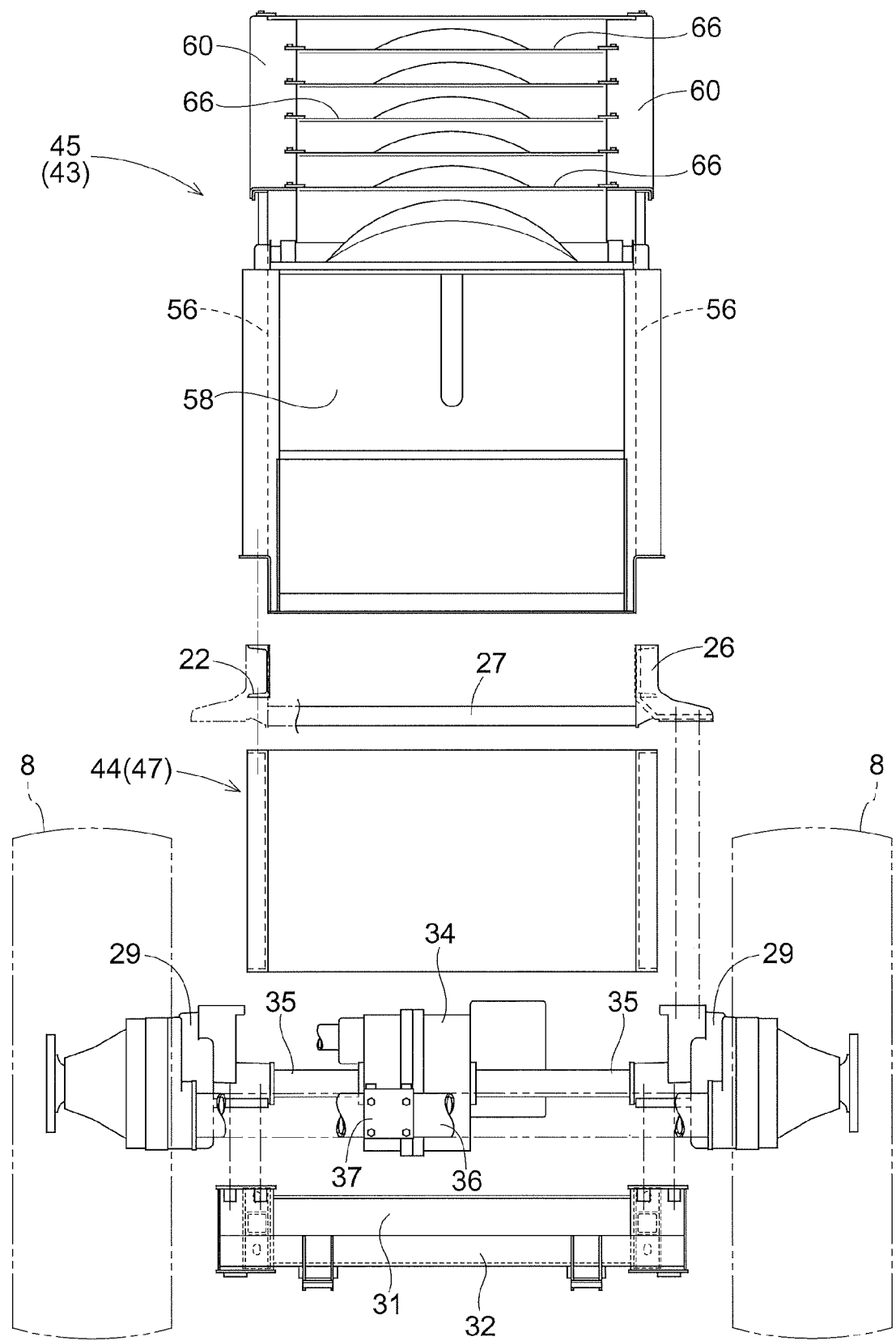
FIG. 9 is a vertical cross-sectional front view showing the support structure of the threshing device.

As shown in FIGS. 7 and 9, axle cases 29 that rotatably support the axle of the front wheels 8 are bolted to the lower surface of the left and right base portions 26 projecting forward from the left and right main frames 22. Therefore, the front side of the main frames 22 is supported by the front wheels 8.

The left and right axle cases 29 are connected by the lower lateral frame 28.

The lower lateral frame 28 includes left and right front-rear oriented connecting bodies 30 extending in the front-rear direction, a rear side laterally oriented connecting body 31 that connects the rear portion of the left and right front-rear oriented connecting bodies 30, and a front side laterally oriented connecting body 32 that connects the front portion of the left and right front-rear oriented connecting bodies 30. The front side laterally oriented connecting body 32 is connected by bolting to the left and right axle cases 29.

A transmission case 34 including a travel driving device A for driving travel (see FIG. 19) is provided so as to enter between the upper lateral frame 27 and the lower lateral frame 28. As shown in FIG. 9, on the left and right sides of the transmission case, there are provided the axle cases 29 for the left and right front wheels 8, and left and right relay transmission cases 35 that connect the transmission case 34 to the left and right axle cases 29. Between the transmission case 34 and the relay transmission cases 35, and between the relay transmission cases 35 and the axle cases 29, respectively, flanges are connected by bolt fastening. Therefore, the axle cases 29 of the left and right front wheels 8, the left and right relay transmission cases 35, and the transmission case 34 are integrally connected.

The rear lower portions of the left and right axle cases 29 are connected by a laterally oriented pipe frame 36 made of a round pipe material. The internal space of the laterally oriented pipe frame 36 is used as a storage unit for hydraulic oil. Further, the front end portion of the transmission case 34 is connected to an intermediate portion in the left-right direction of the laterally oriented pipe frame 36 through a connecting member 37.

As is clear from the above description, a front side traveling unit connecting body that connects the left and right traveling units 7 (the front wheels 8) to each other is configured with the front side connection portion 23.

Following is a description of the rear side connection portion 24.

As shown in FIG. 5, the rear side connection portion 24 is provided with a rear connecting body 38 made of a round pipe material located below the left and right main frames 22 and extending across the left and right main frames 22. A rear wheel support body 39 serving as a traveling device support body provided across the left and right rear wheels 9 is supported by the rear connecting body 38 so as to be swingable around a front-rear axis P2. In other words, a rear side traveling unit connecting body that connects the left and right traveling units 7 (the rear wheels 9) is configured with the rear wheel support body 39.

That is, support frames 40 protruding downward are provided at a position on the rear side of the vehicle body in the left and right main frames 22, and the rear connecting body 38 is connected bridged across the support frames 40 on both left and right sides. A rolling support portion 41 is provided in a fixed state in an intermediate portion in the left-right direction of the rear connecting body 38, and an intermediate portion in the vehicle width direction of the laterally oriented rear wheel support body 39 is supported by the rolling support portion 41 so as to be swingable around the axis P2 in the vehicle front-rear direction.

At both left and right end portions of the rear wheel support body 39, the left and right rear wheels 9 are supported so as to be swingable around the vertical axis, and a steering cylinder 42 is provided in the left-right direction on the rear side of the rear wheel support body 39. By operating the steering cylinder 42, the rear wheels 9 can be operated to swing around the vertical axis to perform a turning operation.

Threshing Device

Following is a description of the threshing device 4.

As shown in FIGS. 6, 7, 8, and 9, the threshing apparatus 4 includes a threshing unit 43 that performs a grain removal process, and a sorting unit 44 that performs a sorting process of sorting processed articles after the grain removal process has been performed by the threshing unit 43. The threshing unit 43 is provided with a substantially box-shaped threshing frame 45 in a state surrounding the outer peripheral portion, and inside the threshing frame 45, there is provided a threshing cylinder 46 that rotates around a rotation axis along the vehicle body front-rear direction. A process of removing grain from reaped grain culm is performed by the threshing cylinder 46.

The sorting unit 44 is provided with a sorting unit frame 47 composed of a rectangular peripheral wall portion. Inside the sorting unit frame 47, a sorting processing unit 48 is provided that, while shaking and transferring the processed articles after the grain removal process has been performed, sorts these articles into grain, secondary products such as branch-attached grain, waste straw and the like (see FIGS. 8 and 19).

Thus, the threshing unit 43 and the sorting unit 44 are each configured with the threshing frame 45 and the sorting unit frame 47 as frame structures whose outer peripheral portions covering the periphery have a large supporting strength. A shredding device 49 that shreds the threshed material (waste straw and the like) after threshing in the threshing device 4 is provided on the vehicle body rear side of the threshing device 4.

Figure 19:
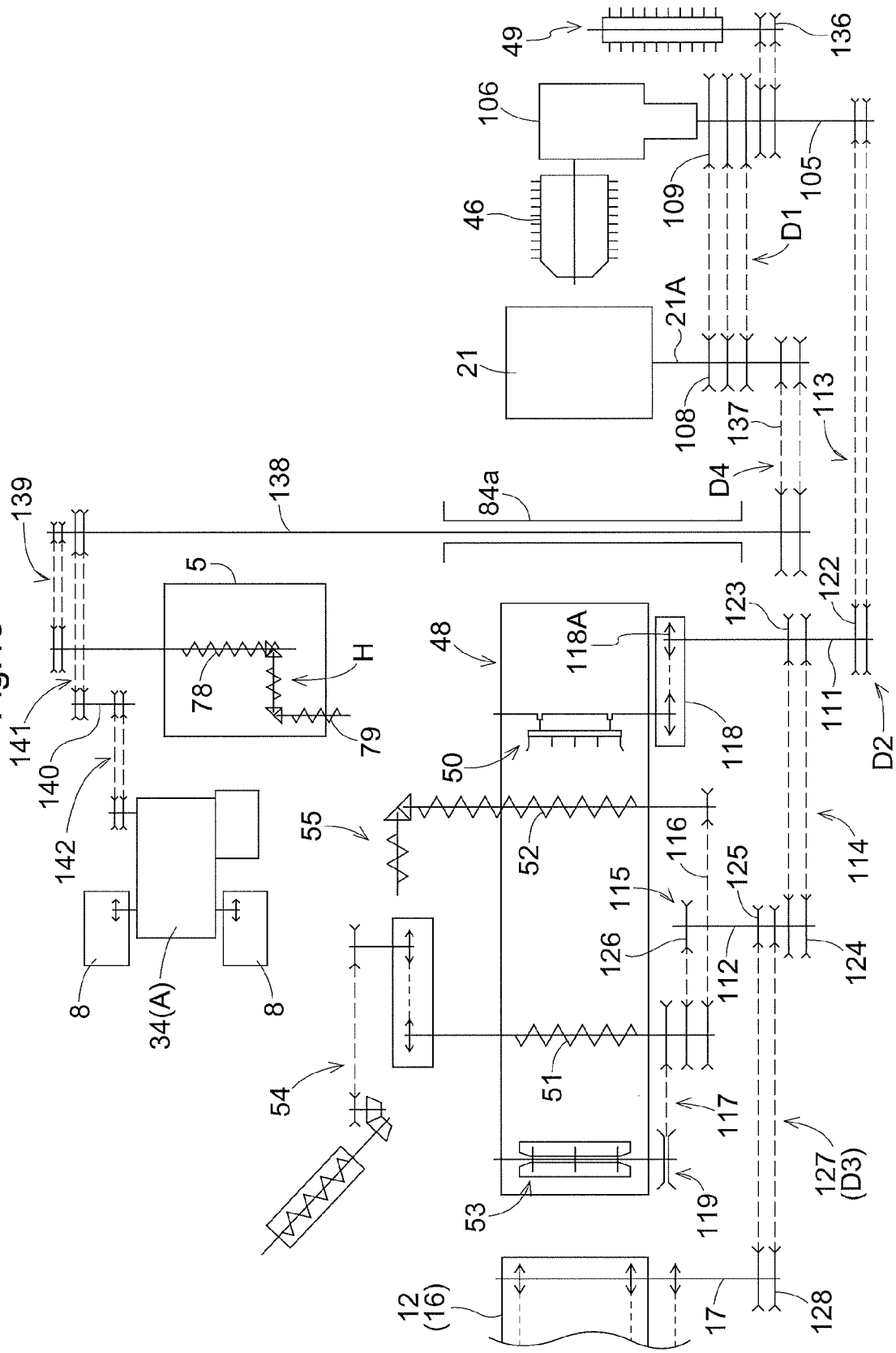
FIG. 19 is a transmission system diagram.

As shown in FIG. 19, the sorting processing unit 48 provided in the sorting unit 44 includes a screw conveyor type primary product collection device 51 that transports grain sorted by leaking downward while shaken and transported by the shake sorting device 50 to one lateral side, a screw conveyor type secondary product collection device 52 that transports secondary products to one lateral side, and a blowing device 53 that supplies a sorting air to the processed articles.

Figure 16:
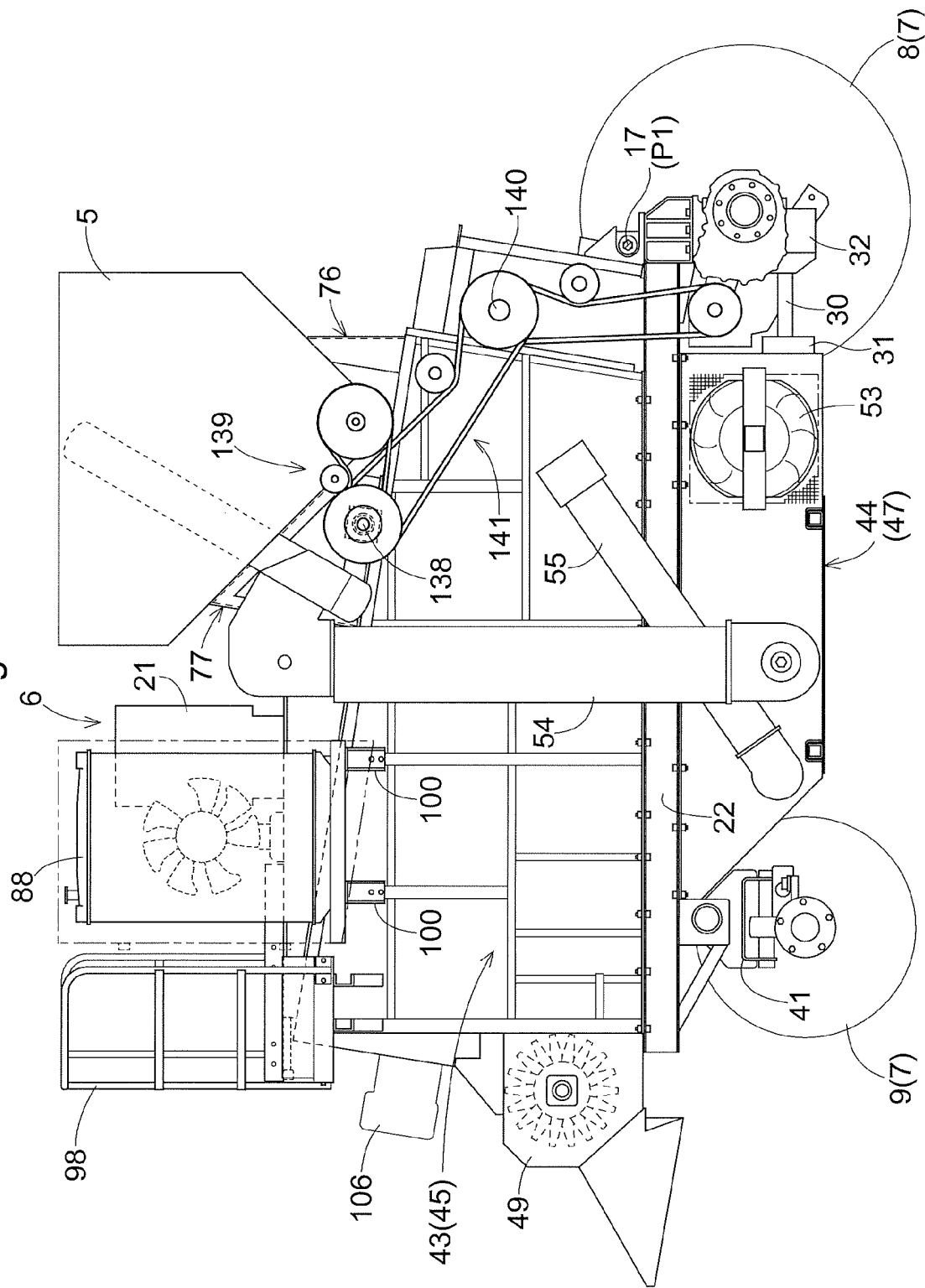
FIG. 16 is a right side view showing a transmission structure on the right side of the vehicle body.

As shown in FIG. 16, on the right outside of the sorting unit 44, a grain transport conveyor 54 serving as a primary product transport device that transports the grain transported by the primary product collection device 51 into the grain tank 5 above, and a secondary product returning device 55 for returning the secondary products transported by the secondary product collection device 52 to the threshing unit 43, are provided.

Also, the threshing frame 45 used to configure the threshing unit 43 is mounted on and supported by the left and right main frames 22.

Figure 6:
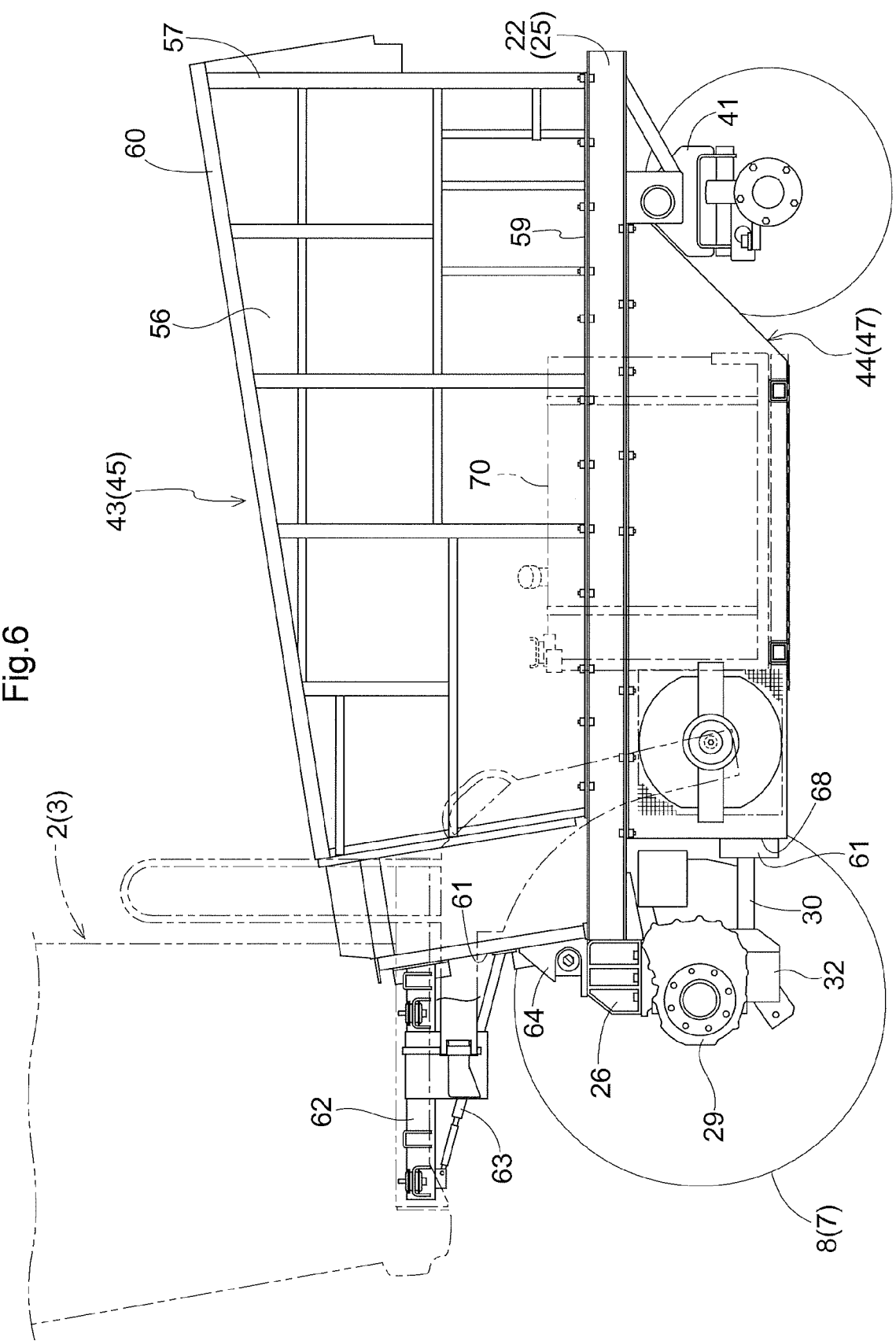
FIG. 6 is a side view showing a support structure of a threshing device.
Figure 14:
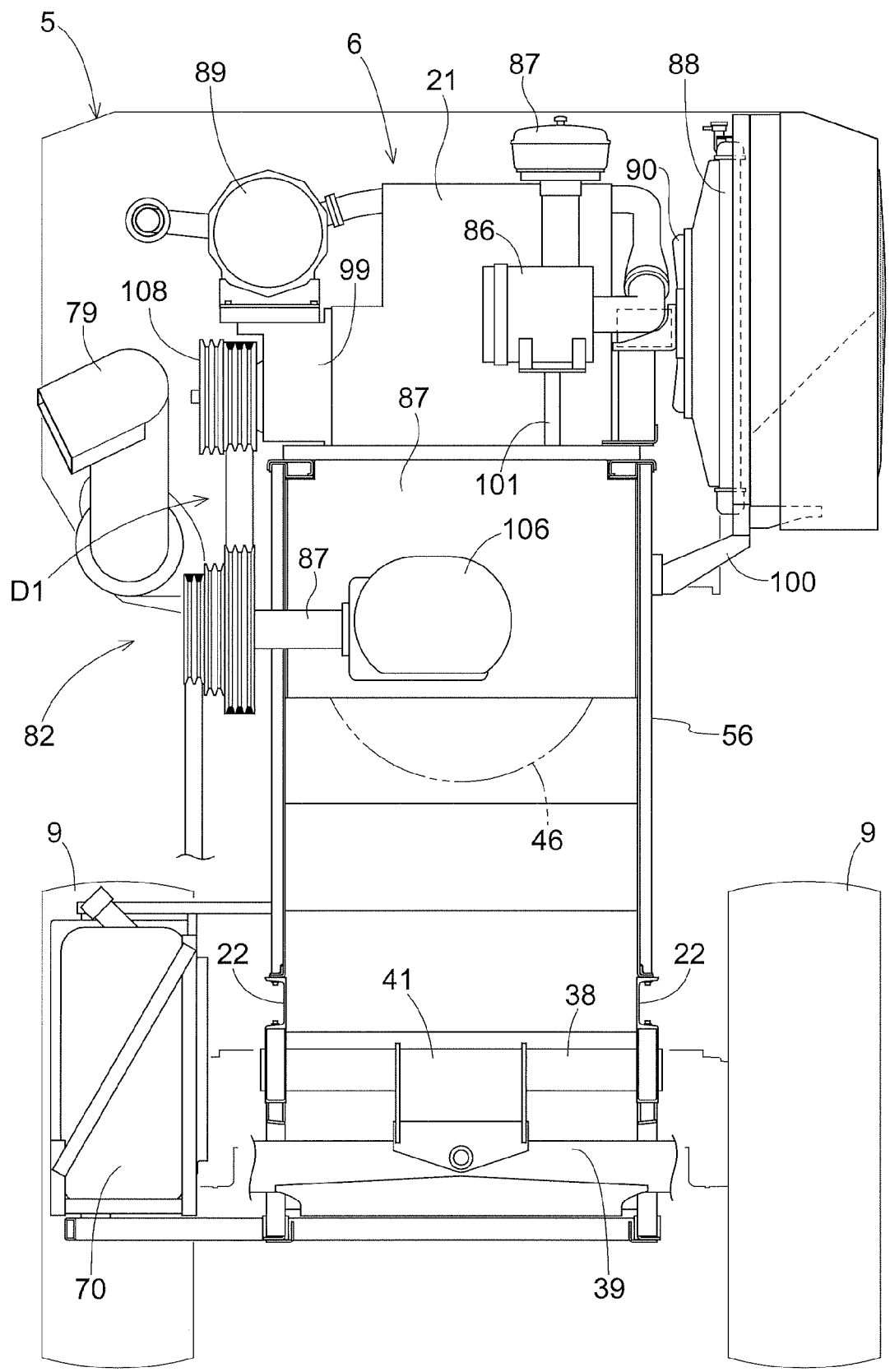
FIG. 14 is an overall rear view in a state where the motor cover is removed.

As shown in FIGS. 6, 9, and 14, the threshing frame 45 extends on both left and right sides of the threshing unit 43 across the entire area in the front-rear direction, and is provided with a substantially plate-like side wall portion 56 serving as left and right vertically oriented support portions extending in the vertical direction, a substantially plate-shaped rear wall portion 57 connecting the rear end portions of the left and right side wall portions 56, a substantially plate-shaped front wall portion 58 connecting the front end portions of the left and right side wall portions 56, a plurality of reinforcing support bodies surrounding the peripheral portion of the above wall portions, and the like, and these are connected together as a single body. The front wall portion 58 and the rear wall portion 57 are formed with openings through which articles pass after undergoing threshing processing.

Figure 8:
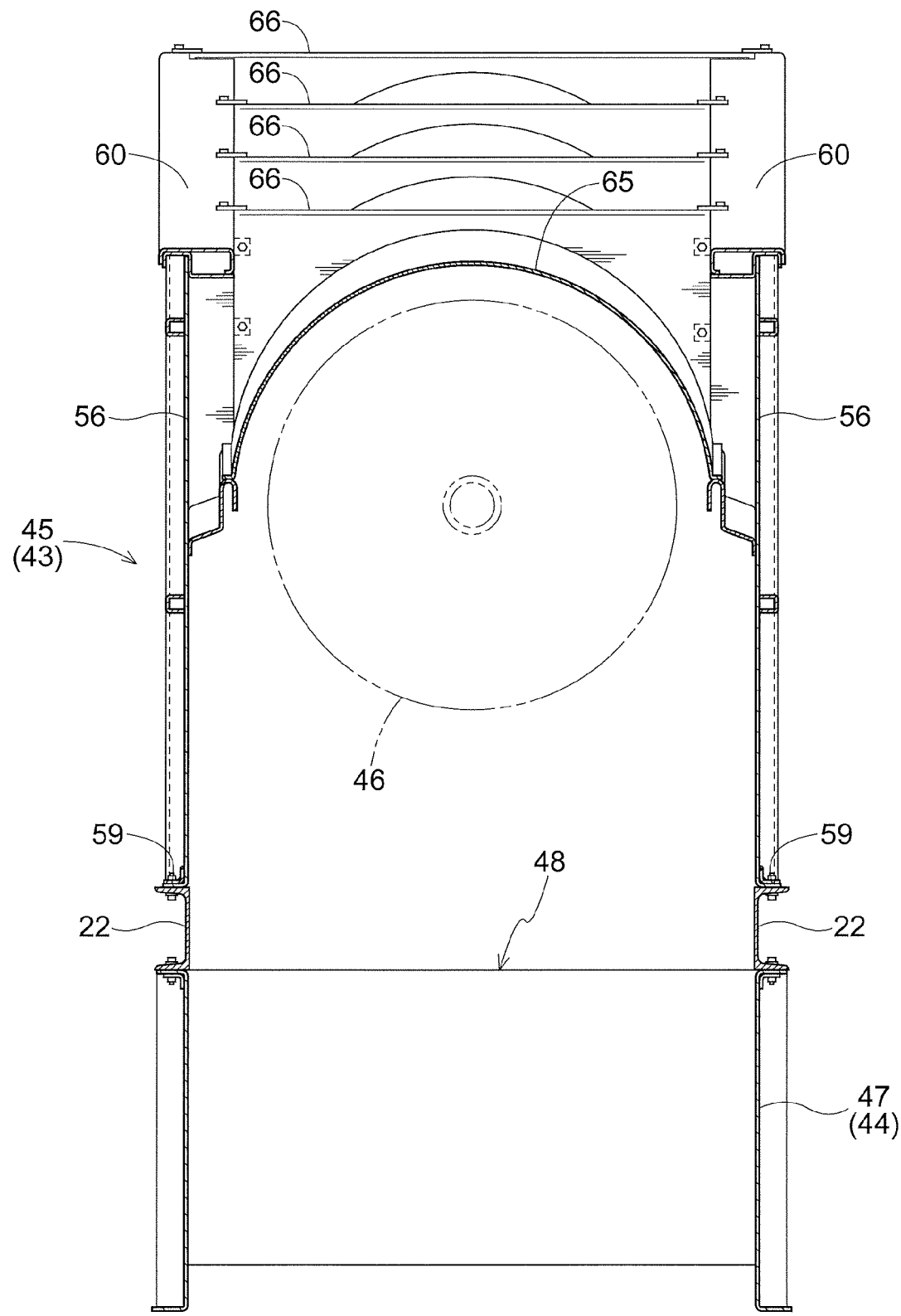
FIG. 8 is a vertical cross-sectional front view of the threshing device.

The reinforcing support bodies are made of a rectangular cylindrical material, an angled material, or the like, and as a plurality of reinforcing support bodies, as shown in FIGS. 6 and 8, there are provided left and right lower portion support bodies 59 extending in the front-rear direction along the lower edges of the left and right side wall portions 56, left and right upper portion support bodies 60 extending in the front-rear direction along the upper edges of the left and right side wall portions 56, and left and right vertically oriented frame bodies 61 extending in the vertical direction along the left and right edges of the front wall portion 58, and the like.

The threshing frame 45 is mounted on and supported by the left and right main frames 22. More specifically, in a state where the left and right lower portion support bodies 59 of the threshing frame 45 are mounted on the upper face of the left and right main frames 22, the lower portion support bodies 59 and the main frames 22 are fixed by connecting with bolts at a plurality of locations.

As shown in FIG. 6, the left and right main frames 22 are provided in a lateral state in which the vehicle body is in a substantially parallel posture with respect to the ground contact surface when the vehicle body is in contact with the ground. On the other hand, these frames are provided in a state inclined upward to the rear, in which the upper portion of the threshing device 4 is positioned upward towards the rear side of the vehicle body. That is, the left and right upper support bodies 60 are provided in a state inclined upward to the rear along the upper portion of the threshing device 4.

The driving portion 3 is mounted on and supported by a driving portion frame 62 fixedly connected to the threshing frame 45. In the driving portion frame 62, a base end portion is connected and fixed to the upper sides of the left and right vertically oriented frame bodies 61, which are reinforcing support bodies at the front end of the threshing frame 45, and is provided in a state protruding in a cantilever manner toward the front of the vehicle body. Further, in the driving portion frame 62, an intermediate portion in the forward protruding direction is received and supported by rod-shaped left and right reinforcing members 63 that extend obliquely forward and upward from a position below the connection location of the base end portion in the left and right vertically oriented frame bodies 61. The driving portion frame 62 is provided in a horizontal state so as to be substantially parallel to the ground surface.

The driving portion 3 is surrounded by the cabin 2, and the entire driving portion 3 including the cabin 2 is configured with an integrated box-shaped body. This sort of driving portion 3 is mounted on and supported by the driving portion frame 62 through a vibration-proof rubber (not shown), and is fixed by a bolted connection.

As shown in FIG. 6, a bearing bracket 64 (see FIG. 6) that receives and supports the base end portion of the reaping transport unit 1 is received by and supported across the front face of the vertically oriented frame body 61 and the upper face of the base portion 26 as a forward protruding portion that protrudes forward with respect to the left and right vertically oriented frame bodies 61 from the left and right main frames 22. The base end portion is rotatably supported by the bearing bracket 64, and the entire reaping transport unit 1 is supported so as to be swingable around the lateral axis P1.

A top plate 65 covering the upper portion of the threshing cylinder 46 has a shape that is curved in a substantially semi-cylindrical shape along the outer peripheral surface of the threshing cylinder 46. A threshing upper connecting body 66 that connects the upper portions of the left and right side wall portions 56 is provided above the top plate 65. As shown in FIGS. 7 and 8, a plurality of the threshing upper connecting bodies 66 are provided in a state arranged at appropriate intervals in the front-rear direction of the vehicle body. The threshing upper connecting bodies 66 are formed in an arc shape so that the lower end edge thereof conforms to the shape of the top plate 65, and is appropriately bolted in a state where the lower end edge is applied to the top plate 65. In this way, the threshing upper connecting bodies 66 are supported by the top plate.

The sorting unit frame 47 used to configure the sorting unit 44 is suspended from and supported by the left and right main frames 22.

Figure 10:
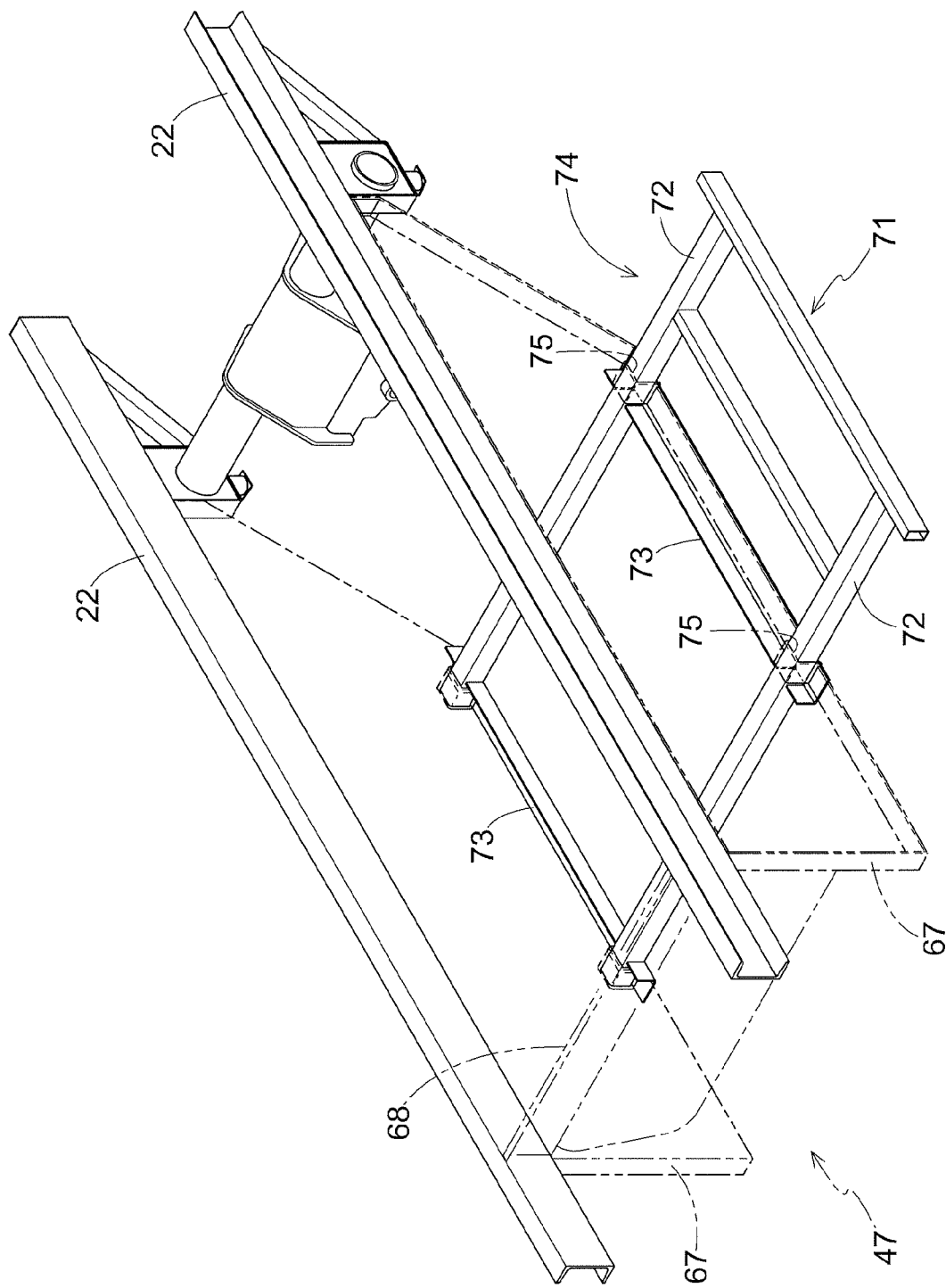
FIG. 10 is a perspective view showing a configuration of a sorting unit frame and a fuel tank frame.

As shown in FIG. 10, the sorting unit frame 47 includes side wall portions 67 that cover both left and right sides of the sorting unit 44, and a front side support portion 68 that connects the front sides of the left and right side wall portion 67 to each other, and the sorting unit frame 47 is thus formed in a rectangular frame. The upper ends of the left and right side wall portions 67 are abutted against the lower surfaces of the left and right main frames 22, fixed by bolts, and thus suspended and supported.

The front end portion of the sorting unit frame 47 and the front side connection portion 23 of the vehicle body frame 25 are connected. Specifically, the rear side laterally oriented connecting body 31 in the lower lateral frame 28 used to configure the front side connection portion 23 of the vehicle body frame 25, and the front end portion of the left and right side wall portions 67 of the sorting unit frame 47, are connected to each other by bolting.

Fuel Tank

Following is a description of the support structure of the fuel tank 70.

As shown in FIGS. 2 and 7, the fuel tank 70 is provided between the left front wheel 8 and the rear wheel, and is positioned to the left lateral outside of the sorting unit 44. A fuel tank support frame 71 where the fuel tank 70 is mounted and supported is provided. As shown in FIG. 10, the fuel tank support frame 71 connects both left and right sides of the lower portion of the sorting unit frame 47 and protrudes outward on the left side of the vehicle body with respect to the main frame 22 on the left side among the left and right main frames 22.

The fuel tank support frame 71 includes two laterally oriented members 72 extending in the left-right direction while being separated in the front-rear direction, two front-rear oriented members 73 connecting the right end portions of the two laterally oriented members 72 and left and right intermediate portions, and a tank mounting portion 74 provided at a left end portion of the two laterally oriented members 72. The laterally oriented members 72 are configured with a square pipe material, and the front-rear oriented members 73 are configured with an angled material.

At the lower ends of the left and right side wall portions 67 of the sorting unit frame 47, recessed portions 75 into which the laterally oriented members 72 enter are formed at positions corresponding to the front and rear laterally oriented members 72. The fuel tank support frame 71 is mounted from the lower side of the sorting unit frame 47 so that the front and rear laterally oriented members 72 enter the recessed portions 75, and the two front and rear members 73 are fixed by bolting connection from below to the left and right side wall portions 67. The tank mounting portion 74 protrudes outward to the left side with respect to the left side wall portion 67 of the sorting portion frame 47, and the fuel tank 70 is mounted on and supported by the tank mounting portion 74.

Grain Tank

Following is a description of the grain tank 5.

As shown in FIGS. 1, 2, 15, and 16, the grain tank 5 is provided above the threshing device 4 so as to be located on the front side of the vehicle body. The grain tank 5 is supported on an upper portion of the threshing frame 45. That is, the grain tank 5 is mounted on and supported by left and right upper support bodies 60 of the threshing frame 45 through a front side tank support frame 76 on its vehicle body front side, and is mounted on and supported by the left and right upper support bodies 60 through a rear side tank support frame 77 on its vehicle body rear side.

The grain tank 5 is provided with a grain discharging device H that discharges grain to be stored to the outside of the vehicle body. In the grain discharge device H, a transverse feed transport unit 78 that is located in a lower portion inside the grain tank 5 and feeds grain sideways, and a discharge conveyor 79 that is located outside the grain tank 5 and transports grain transported by the transverse feed transport unit to a discharge location, are provided.

Figure 11:
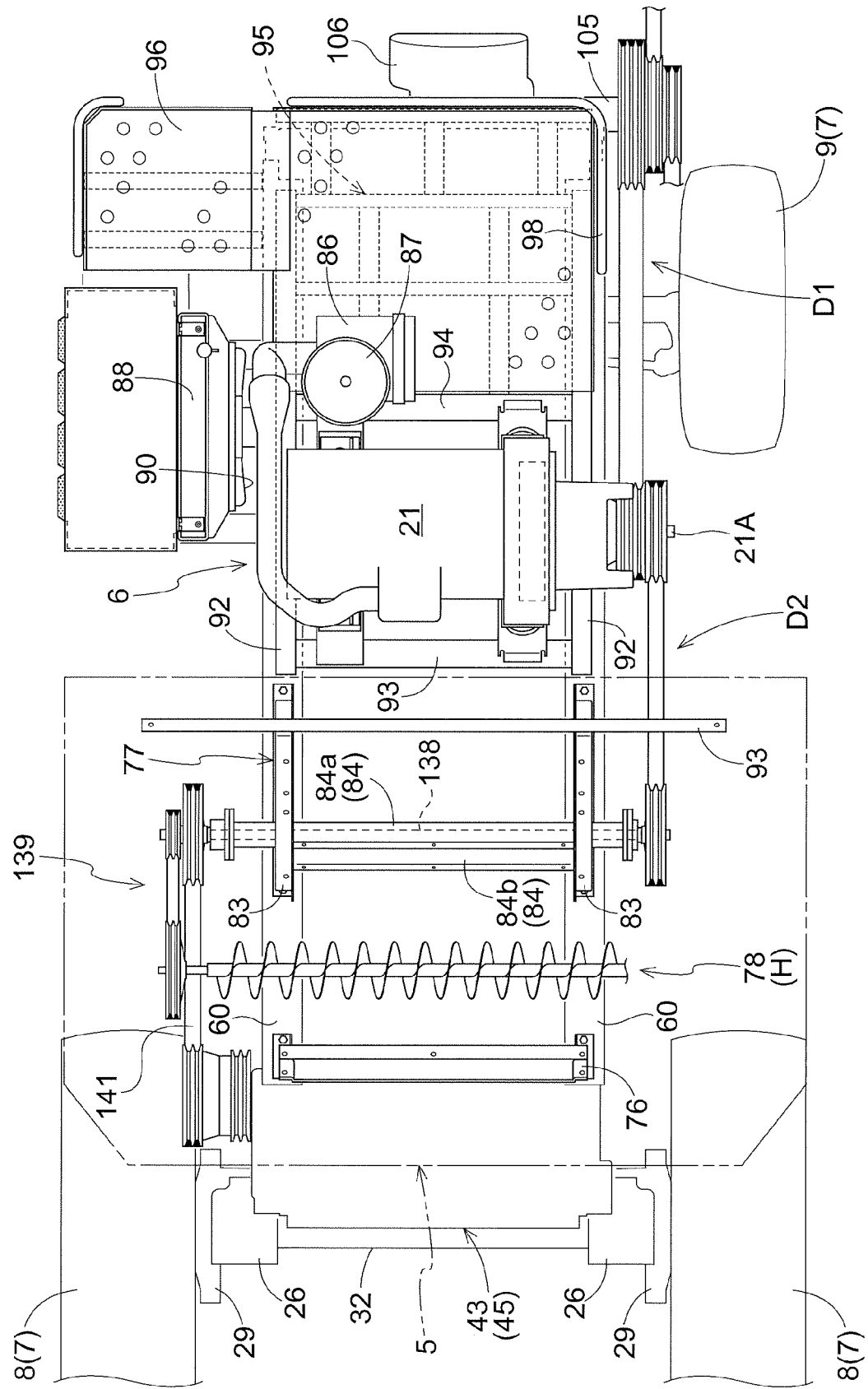
FIG. 11 is an overall plan view of a state where a grain tank and a motor cover are removed.
Figure 15:
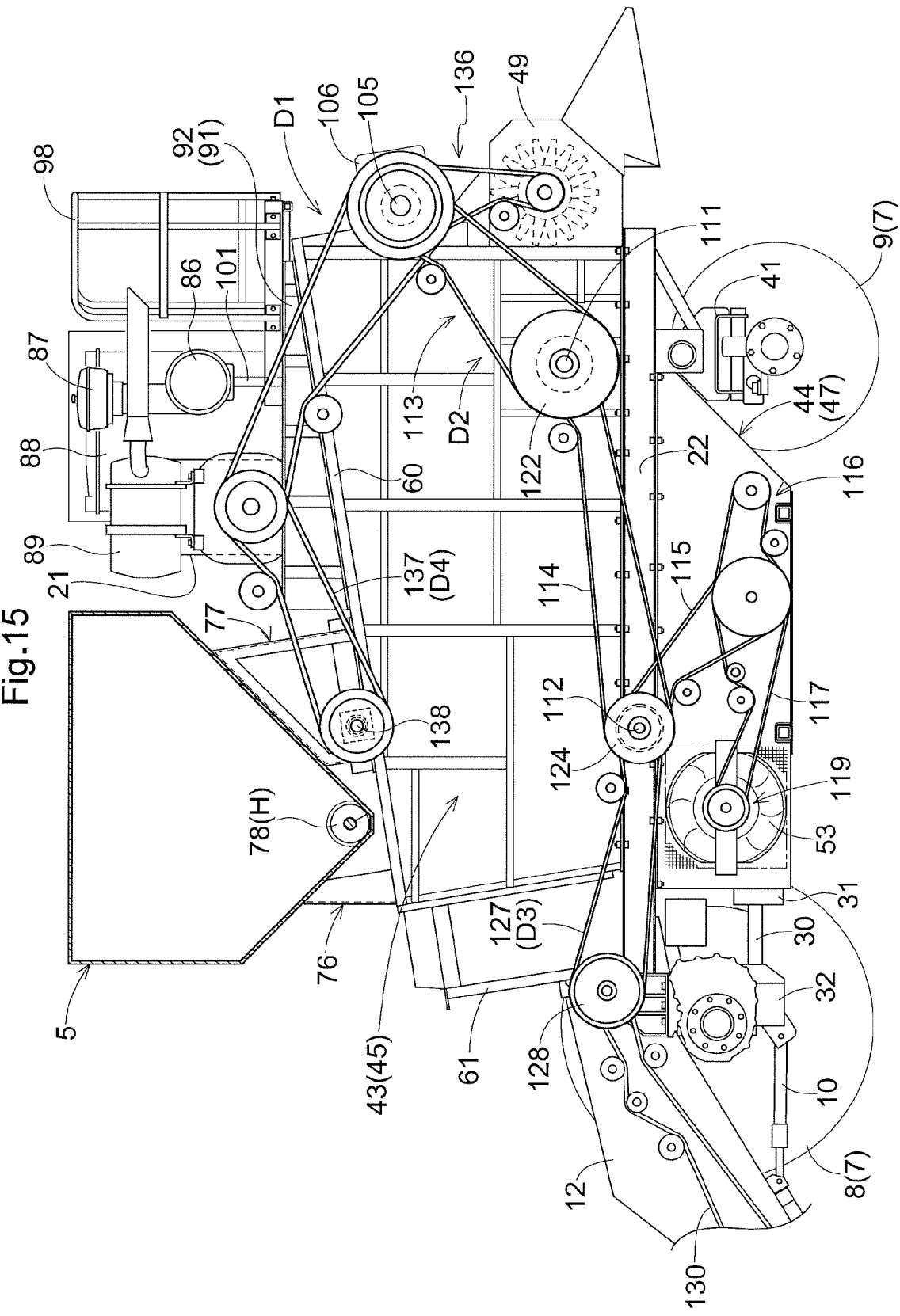
FIG. 15 is a left side view showing a transmission structure on the left side of the vehicle body.

More specifically, as shown in FIGS. 11 and 15, the bottom face of the grain tank 5 is formed in a downward funnel shape as viewed in the left-right direction, and the screw type transverse feed transport unit 78 is provided at the lower end of the downward funnel portion inside the grain tank 5. Grain to be stored is guided to flow down toward the transverse feed transport unit 78 when discharged. As shown in FIG. 2, the screw conveyor type discharge conveyor 79 for discharging the grain transported by the transverse feed transport unit 78 toward a discharge location outside the vehicle body is provided outside the grain tank 5 on the left side.

The grain tank 5 is formed in a downward funnel shape when viewed in the front-rear direction of the vehicle body, and the discharge conveyor 79 is provided in a state where a base end portion 80 is supported by the downward funnel-shaped inclined surface portion of the grain tank 5. The base end portion 80 is supported so as to be capable of rotating around an axis perpendicular to the inclined surface. The discharge conveyer 79 is configured to be switchable, by rotating the base end portion with a hydraulic cylinder 81, between a protruding state in which a tip portion protrudes outward from the vehicle body and a stored state in which the tip portion is withdrawn toward the inside of the vehicle body. In the stored state, as shown in FIG. 2, the discharge conveyer 79 has a rearwardly inclined posture that is located higher toward the rear side of the vehicle body, and as shown in FIG. 14, is housed in a state entering a downward funnel-shaped recessed portion 82 of the grain tank 5. As shown in FIG. 14, similarly to the discharge conveyor 79, the fuel tank 70 is also housed in a state entering the downward funnel-shaped recessed portion 82 of the grain tank 5.

As shown in FIG. 15, the grain tank 5 has a bottom surface in a rearwardly inclined position on the front side supported by the front side tank support frame 76, and a bottom surface in a rearwardly inclined position on the rear side supported by the rear side tank support frame 77.

As shown in FIG. 11, the front side tank support frame 76 extends across the left and right side wall portions 56 of the threshing frame 45, and is mounted on and supported by the left and right upper support bodies 60 located at the upper edges of the left and right side wall portions 56, and connected by bolting.

The rear side tank support frame 77, similarly to the front side tank support frame 76, extends across the left and right side wall portions 56 of the threshing frame 45, and is mounted on and supported by the left and right upper support bodies 60 located at the upper edges of the left and right side wall portions 56.

As shown in FIG. 11, the rear side tank support frame 77 includes left and right tank lateral support portions 83 located on both left and right sides, and a plurality of left and right tank lateral support portions 84 connecting the left and right tank lateral support portions 83 to each other. The left and right tank lateral support portions 83 are each formed in a substantially trapezoidal frame shape in a side view.

Among the left and right tank lateral support portions 84, a lower connecting member 84a that connects the lower portions of the left and right tank lateral support portions 83 is formed in a round pipe shape. Also, although the transmission structure will be described later, a rotating shaft (a counter shaft 138) for power transmission is inserted and supported so as to be rotatable around the left-right axis inside the lower connecting member 84a. The left and right tank lateral support portions 83 are connected to each other by a plurality of connecting members 84b in addition to the round pipe-shaped left and right tank connecting portions 84, thereby securing the support strength.

Motor

Following is a description of the motor 6.

As shown in FIG. 15, the motor 6 is supported by the threshing frame 45 in a state located to the rear side of the grain tank 5. As shown in FIGS. 1 and 2, substantially the entire outer peripheral portion of the motor 6 is covered with a motor cover 85. As shown in FIGS. 11 and 15, the inside of the motor cover 85 is provided with the engine 21 serving as a power source, an air cleaner 86 that purifies combustion air supplied to the engine 21, a pre-cleaner 87 that supplies air to the air cleaner 86 by removing dust from that air in advance, a radiator 88 that cools the engine 21, an exhaust treatment device 89 that purifies exhaust gas from the engine 21, and the like. A cooling fan 90 that generates cooling air is provided near the radiator 88. The exhaust treatment device 89 includes a diesel particulate filter (DPF) to reduce particulate matter (PM) such as diesel particulates contained in exhaust gas. Note that the motor cover 85 is configured to be easily opened for maintenance work.

An engine support frame 91 that supports the engine 21 is provided. The engine support frame 91 extends across the left and right side wall portions 56 of the threshing frame 45 and is mounted on and supported by the upper portion support bodies 60 located at the upper edges of the left and right side wall portions 56.

Figure 12:
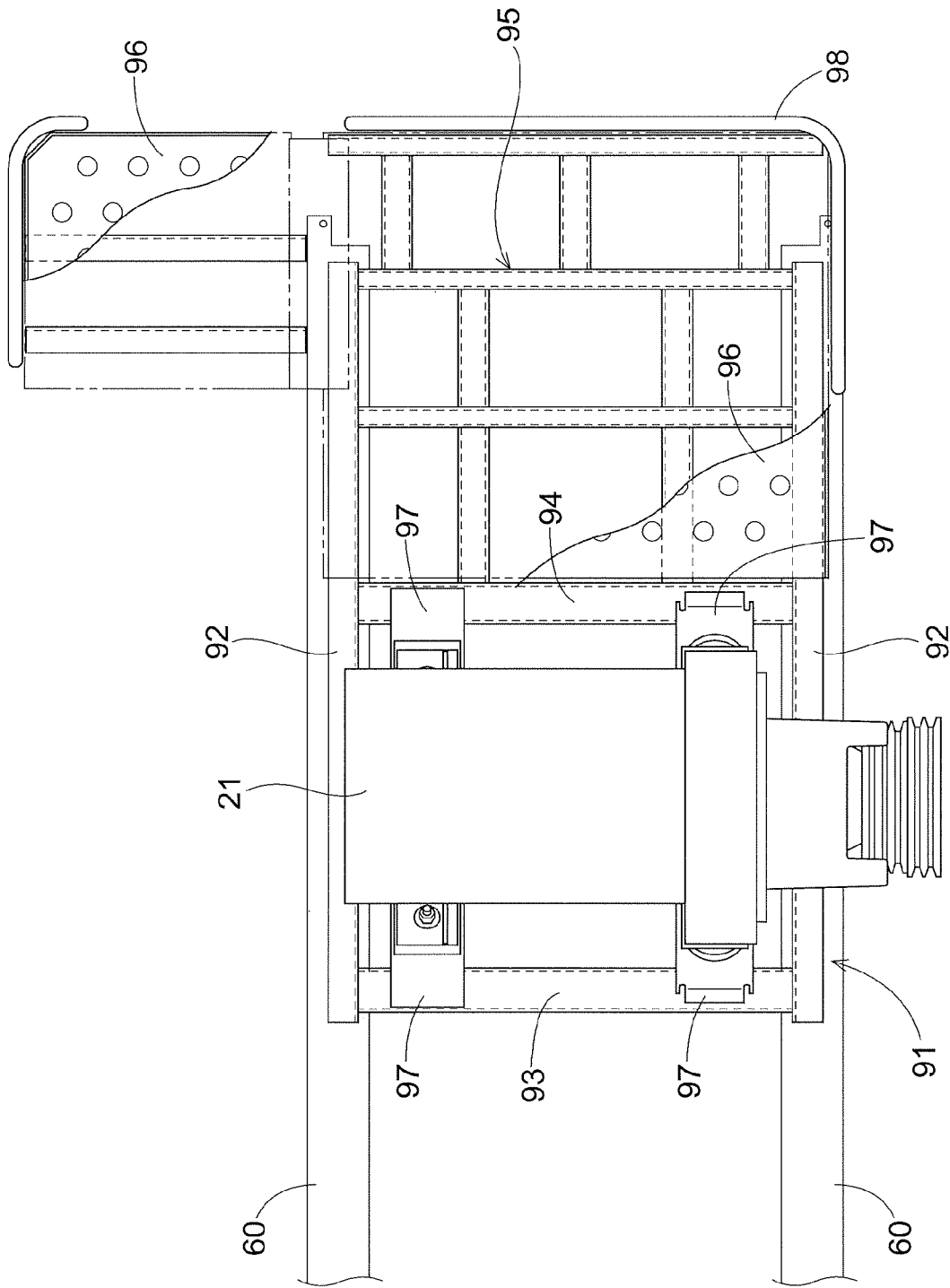
FIG. 12 is a plan view of an engine support frame.
Figure 13:
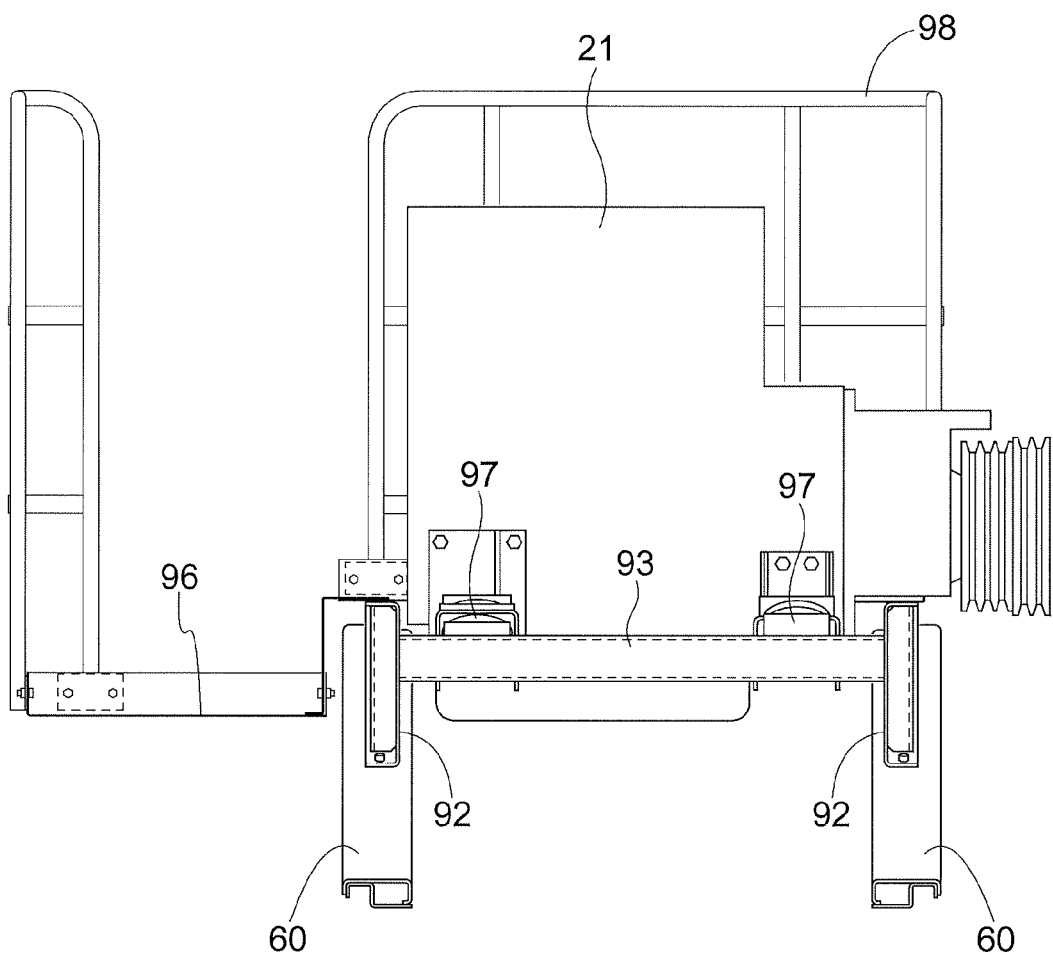
FIG. 13 is a front view of the engine support frame.

As shown in FIGS. 12 and 13, the engine support frame 91 includes side vertical surface portions 92 serving as left and right engine lateral support portions where the upper side of the left and right upper portion support bodies 60 extend in the front-rear direction, front portion connecting members 93 as front side engine left and right connecting portions that connect the front portions of the left and right side vertical surface portions 92 to each other, rear portion connecting members 94 as rear side engine left and right connecting portions that connect intermediate portions in the front-rear direction of the left and right side vertical surface portions 92 to each other, and a rear support portion 95 that connects a rear end side location of the left and right side vertical surface portions 92 to each other. A work table 96 which an operator can board for maintenance work of the motor 6 and the like is mounted on and supported by the rear support portion 95.

As shown in FIG. 15, the left and right side vertical surface portions 92 are formed so that the vehicle body front side is wide in the vertical direction and the width on the vehicle body rear side is substantially gradually reduced. The lower edges of the left and right side vertical surface portions 92 are bolted together while mounted on the left and right upper portion support bodies 60. In each of the front portion connecting members 93 and the rear portion connecting members 94, an engine mounting portion 97 for mounting and supporting the engine 21 is provided on both left and right sides. The engine 21 is mounted on and supported by the four engine mounting portions 97 through rubber mounts. The rubber mounts absorb the vibration of the engine 21 so that the vibration is not transmitted to the driving portion 3. A protection fence 98 that protects the worker is provided on the outer periphery of the work table 96.

The left and right upper portion support bodies 60 are provided in a state inclined upward to the rear, such that they are located on the upper side toward the rear side of the vehicle body, and are formed so that the left and right side vertical surface portions 92 are successively narrower toward the rear side of the vehicle body. Therefore, the upper edges of the left and right side vertical surface portions 92 are in a horizontal state, and the engine mounting portions 97 and the work table 96 are each provided in a horizontal state.

As shown in FIG. 14, the exhaust treatment device 89 and the radiator 88 are disposed on the left and right sides with respect to the engine 21 when viewed in the front-rear direction of the vehicle body, and the radiator 88 is provided so as to protrude outward on the right side with respect to the right side end portion (an example of one side in the left-right direction) of the threshing device 4.

The exhaust treatment device 89 is supported by the engine 21, and the radiator 88 is supported by the threshing device 4. As shown in FIG. 14, the exhaust treatment device 89 is mounted on and supported by a bearing member 99 fixed to a casing of the engine 21. The exhaust treatment device 89 and the engine 21 are provided in a state where the upper end positions are substantially at the same height and are arranged side by side in the left-right direction. The radiator 88 is received and supported by a bracket 100 fixed to the right side wall portion 56 of the threshing frame 45. Although not shown, the cooling fan 90 is driven by a hydraulic motor. Also, although not shown, the motor 6 is provided with a support frame formed in a frame shape for supporting the motor cover 85. The lower end of the support frame is supported by the engine support frame 91. The upper portion of the radiator 88 is supported by the support frame to maintain its posture.

As shown in FIGS. 11 and 15, the air cleaner 86 and the pre-cleaner 87 are provided in a state located on the vehicle body rear side of the engine 21. The air cleaner 86 and the pre-cleaner 87 are supported by the engine support frame 91. The air cleaner 86 is supported by a support portion 101 that is located below and is formed erected from the engine support frame 91.

The work table 96 is provided in a state where the air cleaner 86 and the pre-cleaner 87 are located on the rear side of the vehicle body, so that maintenance work can be easily performed. A ladder 102 (see FIGS. 1 and 2) allowing an operator to board or leave the work table 96 from outside the vehicle body is provided at the rear of the work table 96.

Transmission Structure 1

Following is a description of a power transmission structure for transmitting the power of the engine 21 to the threshing device 4 and the reaping transport unit 1.

As shown in FIG. 11, the engine 21 is provided in a state with an output shaft 21A oriented in the left-right direction and protruding leftward. As shown in FIG. 19, there are provided a first transmission mechanism D1 (corresponding to a threshing drive transmission mechanism) that transmits the power of the engine 21 from the output shaft 21A to a threshing cylinder drive shaft 105 for driving the threshing cylinder, and a second transmission mechanism D2 that transmits power from the threshing cylinder drive shaft 105 to other driven devices provided in the sorting unit 44, that is, the shake sorting device 50, the primary product collection device 51, the secondary product collection device 52, and the blowing device 53. The first transmission mechanism D1 and the second transmission mechanism D2 are arranged so as to be located on the left side of the vehicle body with respect to the engine 21.

As shown in FIGS. 11 and 15, a threshing cylinder gearshift device 106 that shifts the power transmitted to the threshing cylinder drive shaft 105 and transmits the power to the threshing cylinder is provided at a position above the shredding device 49 on the vehicle body rear side of the threshing device 4. The periphery of the threshing cylinder gearshift device 106 is covered with a case, and inside the case, as shown in FIG. 19, the power transmitted from the left-right oriented threshing cylinder drive shaft 105 is shifted up and down in two stages, and transmitted to a front-rear oriented threshing cylinder shaft 107.

As shown in FIGS. 15 and 19, the first transmission mechanism D1 is a belt-type transmission mechanism that transmits power from the output shaft 21A of the engine 21 to the threshing cylinder drive shaft 105. In the first transmission mechanism D1, a transmission belt 110 is wound around an output pulley 108 provided on the output shaft 21A and an input pulley 109 provided on the threshing cylinder drive shaft 105. The first transmission mechanism D1 is located on the left side of the threshing device 4, and is provided in a state inclined downward to the rear so as to be positioned lower toward the rear side of the vehicle body, and transmits power downward to the rear.

As shown in FIGS. 15 and 19, the second transmission mechanism D2 includes a threshing input shaft 111 to which power from the threshing cylinder drive shaft 105 is input, and a threshing relay shaft 112 to which power from the threshing input shaft 111 is transmitted. Power is transmitted from the threshing input shaft 111 to the shake sorting device 50, and is transmitted from the threshing relay shaft 112 to the primary product collection device 51, the secondary product collection device 52, and the blowing device 53.

That is, the second transmission mechanism D2 includes a belt-type first threshing transmission mechanism 113 that transmits power from the threshing cylinder drive shaft 105 to the threshing input shaft 111, a belt-type second threshing transmission mechanism 114 that transmits power from the threshing input shaft 111 to the threshing relay shaft 112, a belt-type third threshing transmission mechanism 115 that transmits power from the threshing relay shaft 112 to the primary product collection device 51, a belt-type fourth threshing transmission mechanism 116 that transmits power from the primary product collection device 51 to the secondary product collection device 52, a belt-type fifth threshing power transmission device 117 that transmits power from the primary product collection device 51 to the blowing device 53, and a chain transmission mechanism 118 that transmits power from the threshing input shaft 111 to the shake sorting device 50 (specifically, a shake driving unit).

As shown in FIG. 15, the threshing cylinder drive shaft 105 is provided at a high position behind the threshing unit 43, and the threshing input shaft 111 is located closer to the front of the vehicle body than the threshing cylinder drive shaft 105 and below the threshing unit 43. As a result, the first threshing transmission mechanism 113 is provided in a state inclined forward. On the other hand, the second threshing transmission mechanism 114 is provided so as to extend in a substantially horizontal posture toward the front from the threshing input shaft 111. Therefore, the first threshing transmission mechanism 113 and the second threshing transmission mechanism 114 are provided in a state bending in a substantially L-shape that protrudes downward. By disposing the transmission mechanisms in this manner, the outside of the left side wall portion 56 of the threshing unit 43 is largely opened, and maintenance work of the threshing unit 43 can be easily performed.

Figure 18:
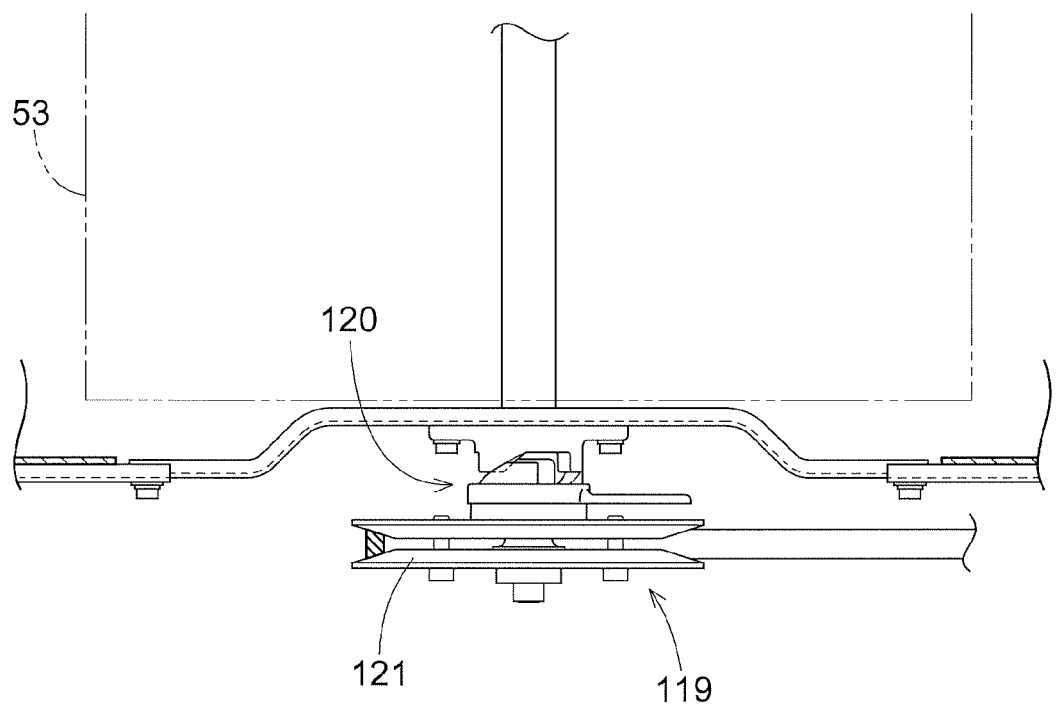
FIG. 18 is a plan view showing a transmission mechanism for blowing air.

The fifth threshing transmission mechanism 117 is provided with a blower speed change mechanism 119 including a split pulley type belted continuously variable transmission. Although not described in detail, as shown in FIG. 18, the blower speed change mechanism 119 can change the belt winding diameter by changing the interval between split pulleys 121 by an internal cam mechanism 120. The operation of the cam mechanism 120 is performed by manual operation or operation by an actuator. The power transmitted to the primary product collection device 51 is transmitted to the grain transport conveyor 54. Further, the power transmitted to the secondary product collection device 52 is transmitted to the secondary product returning device 55.

Figure 17:
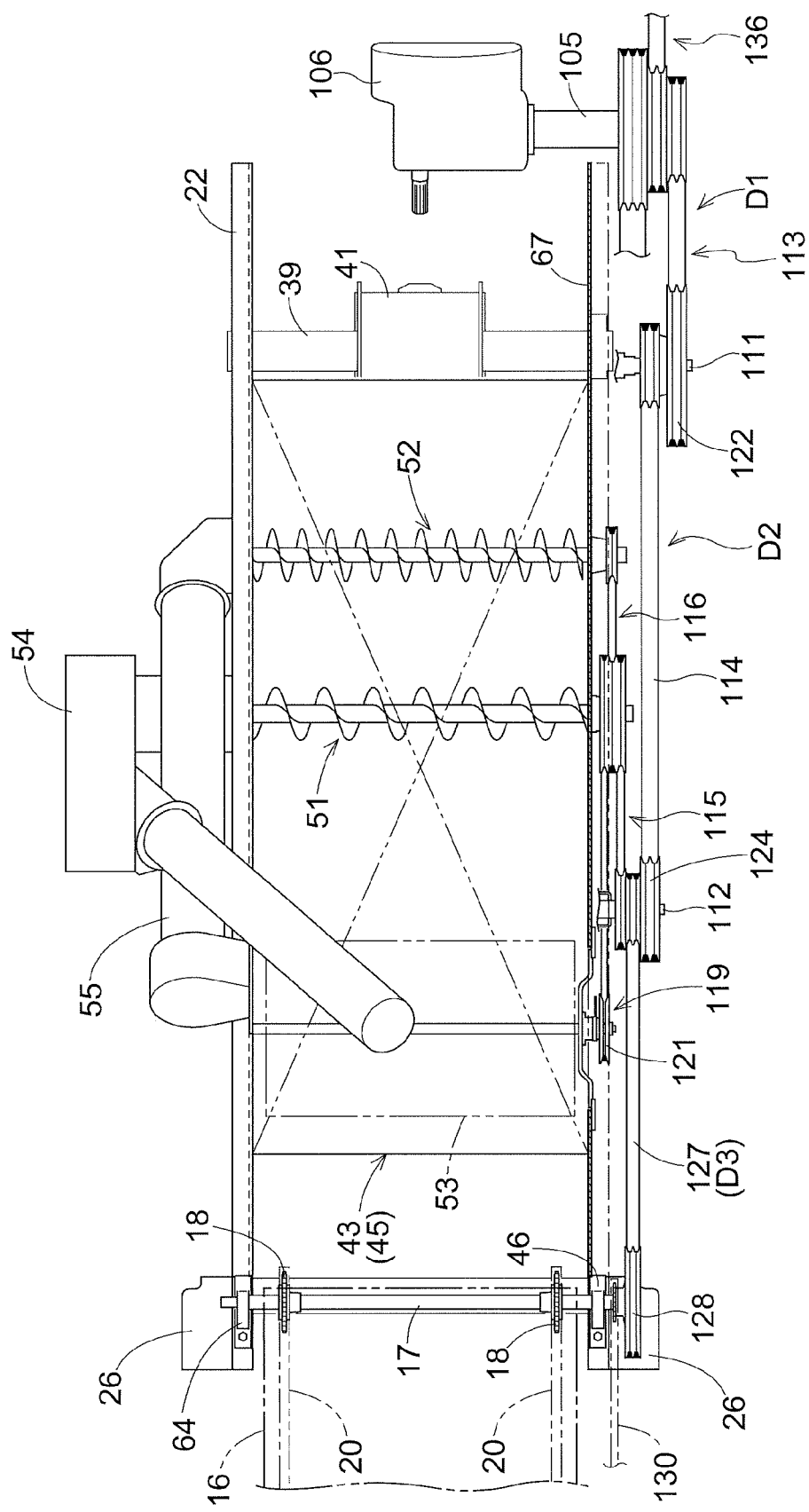
FIG. 17 is a plan view showing the transmission structure.

As shown in FIGS. 17 and 19, on the threshing input shaft 111, in order from laterally outside the vehicle body, supported so as to be capable of rotating as a single body, there are lined up a power input pulley 122 serving as a power input rotating body to which power from the threshing cylinder drive shaft 105 is input, a relay pulley 123 serving as a relay output rotating body that outputs power to the threshing relay shaft 112, and an output sprocket 118A serving as a sorting output rotating body in the chain transmission mechanism 118 that outputs power to the shake sorting device 50.

As shown in FIGS. 11 and 19, on the threshing relay shaft 112, in order from laterally outside the vehicle body, supported so as to be capable of rotating as a single body, there are lined up a relay input pulley 124 serving as a relay input rotating body to which power from the threshing input shaft 111 is transmitted, a reaping transport output pulley 125 serving as a reaping transport output rotating body that outputs power to the reaping transport unit 1, and a sorting output pulley 126 serving as a sorting output rotating body that outputs power to the primary product collection device 51.

A belt-type reaping transmission mechanism 127 is provided as a third power transmission mechanism D3 that transmits the power transmitted to the sorting processing unit 48 to the reaping transport unit 1. The reaping transmission mechanism 127 is configured to transmit the power from the threshing relay shaft 112 to the reaping input shaft 17 of the reaping transport unit 1. The reaping input shaft 17 functions as a drive shaft of the feeder 12 and is provided in a state protruding outward to the left side from the transport case 16 of the feeder 12. As shown in FIG. 15, the reaping transmission mechanism 127 is provided in a state extending in a substantially horizontal posture from the threshing relay shaft 112 toward the front.

As shown in FIG. 17, the reaping transport input pulley 128 serving as a reaping transport input rotating body to which power from the threshing relay shaft 112 is transmitted is supported so as to be capable of rotating as a single body with an outward protruding portion that protrudes outward to the left side from the transport case 16 of the reaping input shaft 17. Also, among the outward protruding portions of the reaping input shaft 17, at locations positioned between the reaping transport input pulley 128 and the feeder 12 (the transport case 16), a reaping output sprocket 129 serving as a reaping output rotating body that outputs power to the rotating reel 13, the cutting blade 14, and the transverse feed auger 15 is supported so as to be capable of rotating as a single body.

As shown in FIGS. 2, 17, and 20, power from the reaping output sprocket 129 is supplied to a reaping relay shaft 131 provided at a rear portion of the reaping header 11 by a transmission chain 130 extending in the front-rear direction along the left outside of the transport case 16. The power from the reaping relay shaft 131 is transmitted to the rotating reel 13 through a reel chain transmission mechanism 132 and a belt transmission mechanism 133, and transmitted to the transverse feed auger 15 through an auger chain transmission mechanism 134, and transmitted to the cutting blade 14 through a belt transmission mechanism 135.

As shown in FIGS. 15 and 19, a belt-type shredding transmission mechanism 136 that transmits power from the threshing cylinder drive shaft 105 to the shredding device 49 is provided. A shredding transmission mechanism 139 is provided so as to extend downward from the threshing cylinder drive shaft 105. Therefore, the second transmission mechanism D2 is configured to branch and transmit the power transmitted to the threshing cylinder drive shaft 105 to the sorting processing unit 48 and the shredding device 49.

As is clear from the above description, a threshing power transmission system that transmits the power from the threshing cylinder drive shaft 105 to a plurality of driven devices provided in the sorting processing unit 48 is collectively provided on the left side of the threshing device 4. Also, a reaping power transmission system, which transmits power from the reaping input shaft 17 to the rotating reel 13, the cutting blade 14, and the transverse feed auger 15, is collectively provided on the left side of the reaping transport unit 1. Therefore, the power transmission unit that transmits the power from the output shaft 21A of the engine 21 to the plurality of driven devices provided in the sorting processing unit 48 is disposed on the left side of the vehicle body with respect to the engine 21 (an example of one side in the left-right direction).

Transmission Structure 2

Following is a description of a power transmission structure for transmitting the power of the engine 21 to the grain discharging device H and the travel driving device A.

As shown in FIGS. 15 and 19, a fourth transmission mechanism D4 that transmits the power from the engine 21 to the grain discharging device H and the travel driving device A is provided, and in the output shaft 21A of the engine 21, the power of the engine 21 is branched to the first transmission mechanism D1 and the fourth transmission mechanism D4. In the fourth transmission mechanism D4, the counter shaft 138 is provided as a first relay shaft to which power is transmitted from the output shaft 21A of the engine 21 through a transmission belt 137, and the power of the engine 21 is supplied from the right end portion of the counter shaft 138 to the grain discharging device H and the travel driving device A in a branched manner. Therefore, the power transmission unit that transmits the power from the output shaft 21A of the engine 21 to the grain discharging device H and the travel driving device A is provided on the vehicle body right side of the engine 21.

The counter shaft 138, which is a rotating shaft for transmission, extends from a lateral portion of the threshing apparatus 4 to the other side portion in a state where the counter shaft 138 is inserted through the inside of the round pipe-shaped lower connecting member 84a in the rear side tank support frame 77, and is supported so as to be capable of rotating around a lateral axis. That is, the counter shaft 138 is provided so as to extend from the left side of the vehicle body as one side in the left-right direction of the vehicle body to the right side of the vehicle body. Power from the output shaft 21A is input to the left side of the vehicle body, power is output from the right side of the vehicle body to the grain discharging device H and the travel driving device A. As shown in FIG. 15, the counter shaft 138 is provided in an area surrounded by the upper face of the threshing device 4, the grain tank 5, and the engine 21 in a side view.

The fourth transmission mechanism D4 includes a belt-type discharge transmission mechanism 139 that transmits the power from the counter shaft 138 to the transverse feed transport unit 78 of the grain discharging device H, a belt-type traveling first transmission mechanism 141 that transmits power from the counter shaft 138 to a traveling relay shaft 140 serving as a second relay shaft provided on the lateral side of the front portion of the threshing unit 43, and a belt-type traveling second transmission mechanism 142 that transmits power from the traveling relay shaft 140 to the travel driving device A.

As shown in FIG. 16, the discharge transmission mechanism 139 is provided in a state extending in a substantially horizontal posture toward the front. The power transmitted from the discharge transmission mechanism 139 is transmitted to the discharge conveyor 79 located on the left side of the vehicle body through the transverse feed transport unit 78.

The traveling first transmission mechanism 141 is provided in a state extending in an inclined posture from the counter shaft 138 downward toward the front. The travel driving device A1 is provided at a position below the grain tank 5 in the lower portion of the vehicle body, and the traveling second transmission mechanism 142 is provided in a state extending downward in a substantially vertical posture from the traveling relay shaft 140.

Although a detailed description of the configuration of the travel driving device A is omitted, the left and right front wheels 8 are driven based on driving operation of a gearshift operation tool, a turning operation tool, and the like (not shown) provided in the driving portion 3, and transmit power so as to drive at an appropriate speed. When traveling straight, the left and right front wheels 8 are driven at a constant speed or substantially at a constant speed, and when turning, they are driven with a difference in speed.

As described above, the output shaft 21A of the engine 21 is provided on the left side of the vehicle body, and the power transmission unit that transmits power from the output shaft 21A to each device of the threshing device 4 and the reaping transport unit 1 is provided on the left side of the vehicle body. The counter shaft 138 is configured to output power to the grain discharging device H and the travel driving device A from the right side of the vehicle body. That is, a power transmission unit that transmits power from the output shaft 21A to the grain discharging device H and the travel driving device A is provided on the right side of the vehicle body. The power transmitted from the right side of the vehicle body from the counter shaft 138 is transmitted to the discharge conveyor 79 located on the left side of the vehicle body through the transverse feed transport unit 78.

Other Embodiments (1) In the above embodiment, a configuration is adopted in which, above the threshing device 4, the grain tank 5 is located on the front side of the vehicle body, and the engine 21 is located on the rear side of the vehicle body, and the grain tank 5 and the engine 21 are lined up in the front-rear direction. Instead, a configuration may also be adopted in which, above the threshing device 4, the engine 21 is located on the front side of the vehicle body, and the grain tank 5 is located on the rear side of the vehicle body, and the grain tank 5 and the engine 21 are lined up in the front-rear direction. Also, a configuration may be adopted in which only the grain tank 5 is disposed above the threshing device 4, or only the engine 21 is disposed above the threshing device 4. Also, a configuration may be adopted in which the grain tank 5 and the engine 21 are disposed at a location to a lateral side of the threshing device 4 or to the rear side of the threshing device 4.

(2) In the above embodiment, a configuration is adopted in which the substantially plate-like side wall portions 56 are provided as the left and right vertically oriented support portions of the threshing frame 45, but instead, a configuration may be adopted in which a dedicated frame member is erected from the main frames separately from the wall covering the side of the threshing unit. Also, the configuration of the threshing frame can be implemented with various changes.

(3) In the above embodiment, a configuration is described in which the front traveling unit connecting body is configured by the front side connection portion 23 including the base portion 26, the upper lateral frame 27, and the lower lateral frame 28, and the rear traveling unit connecting body is configured by the rear wheel support body 39. However, instead, a configuration similar to the front side connection portion 23 may be adopted as the rear traveling unit connecting body, and a configuration similar to the rear wheel support body 39 may be adopted as the front traveling unit connecting body.

(4) In the above embodiment, a configuration is described in which the front portion side of the left and right main frames 22 is connected by the front side connection portion 23, and the rear portion side of the left and right main frames 22 is connected by the rear side connection portion 24. However, instead, a configuration may be adopted in which the rear portion side of the left and right main frames 22 is connected with a connecting portion having the same configuration as the front side connection portion 23, and the front portion side of the left and right main frames 22 is connected with a connecting portion having the same configuration as the rear side connection portion 24.

(5) In the above embodiment, a configuration is adopted in which the threshing upper connecting body 66 that connects the upper portions of the left and right vertically oriented support portions is provided, and the threshing upper connecting body 66 is connected to the top plate 65 of the threshing device 4. Instead of such a configuration, a configuration may be adopted in which the threshing upper connecting body 66 is not connected to the top plate 65 of the threshing device 4.

(6) In the above embodiment, a configuration is adopted in which the transmission case 34 is provided so as to enter between the upper lateral frame 27 and the lower lateral frame 28, but a configuration may also be adopted in which the transmission case 34 partially protrudes outward from an area between the upper lateral frame 27 and the lower lateral frame 28.

(7) In the above embodiment, a configuration is adopted in which the base end portion of the reaping transport unit 1 is supported across the upper faces of the left and right base portions 26 and the front face of the vertically oriented frame body of the threshing frame 45. However, instead, a configuration may be adopted in which the base end portion of the reaping transport unit 1 is supported by the left and right main frames 22 at different locations apart from the vertically oriented frame body of the threshing frame 45.

(8) In the above embodiment, a configuration is adopted in which the exhaust treatment device 89 and the radiator 88 are arranged separately on the left and right sides with respect to the engine 21 when viewed in the front-rear direction of the vehicle body, but instead, a configuration may be adopted in which the exhaust treatment device is provided above the engine.

(9) In the above embodiment, a configuration is adopted in which the traveling unit is provided with the front wheels 8 as a front side traveling device and the rear wheels 9 as a rear side traveling device. However, instead, a configuration may be adopted in which one among the front side traveling device and the rear side traveling device is configured with a crawler traveling device, and the other is configured with wheels. Alternatively, a configuration may be adopted in which the front side traveling device and the rear side traveling device respectively are configured with a crawler traveling device. Also, a configuration may be adopted in which the left and right traveling units respectively are configured with a single crawler traveling device.

INDUSTRIAL APPLICABILITY

The present invention is applicable not only to an ordinary combine harvester, but also to a self-removing combine harvester which performs threshing of a tip side while performing sandwiched transport of the root of reaped grain culm using a feed chain.

DESCRIPTION OF REFERENCE SIGNS

1: reaping transport unit
3: driving portion
4: threshing device
8: front side traveling device
9: rear side traveling device
21: engine
22: main frame
23: front side connection portion (traveling unit connecting body)
24: rear side connection portion
26: base portion
27: upper lateral frame
28: lower lateral frame
29: axle case
30: front-rear oriented connecting body
31: rear side laterally oriented connecting body
32: front side laterally oriented connecting body
34: transmission case
35: relay transmission case
38: rear connecting body
39: traveling device support body (traveling unit connecting body)
43: threshing unit
44: sorting unit
45: threshing frame
47: sorting unit frame
56: vertically oriented support portion
61: vertically oriented frame body
65: top plate
66: threshing upper connecting body
70: fuel tank
71: fuel tank support frame
76, 77: grain tank support frame
88: radiator
89: exhaust treatment device
91: engine support frame

The invention claimed is:
1. A combine harvester, comprising:
left and right main frames that extend in the front-rear direction of a vehicle body, a front side connection portion that connects a front portion of the left and right main frames, and a threshing device installed between the left and right main frames, wherein the threshing device is provided with a threshing unit that performs a grain removal process, and a sorting unit that is provided below the threshing unit and performs a sorting process of sorting processed articles after the grain removal process has been performed by the threshing unit, a threshing frame included in the threshing unit is mounted on and supported by the left and right main frames, and a sorting unit frame included in the sorting unit is suspended from and supported by the left and right main frames, wherein the front side connection portion is provided with base portions provided in the front portion of each of the left and right main frames and an upper lateral frame configured to connect the left and right base portions, wherein axle cases of left and right front side traveling devices fixed to a lower surface of the base portions, a transmission case equipped with a transmission mechanism for driving travel, and left and right relay transmission cases configured to connect the transmission case with the left and right axle cases are provided, wherein in the front portion of the vehicle body, a reaping transport unit is provided that reaps planted grain culm and transports reaped grain culm to the threshing device, wherein left and right vertically oriented frame bodies are provided on respective left and right sides in a front end portion of the threshing frame, wherein the base portions protrude forward with respect to the left and right vertically oriented frame bodies among the left and right main frames, and wherein a base end portion of the reaping transport unit is supported by at least one bearing bracket fixed to:
(i) an upper face of the base portions, and
(ii) a front face of the vertically oriented frame bodies.

2. The combine harvester according to claim 1,
wherein traveling units are provided on both left and right sides of the vehicle body,
an axle of the traveling units is provided at a position lower than the left and right main frames,
the left and right traveling units are provided in a state positioned outside in the left-right direction of the vehicle body with respect to the left and right main frames, and
the left and right main frames are supported by the left and right traveling units.

3. The combine harvester according to claim 2, comprising:
a traveling unit connecting body that connects the left and right traveling units.

4. The combine harvester according to claim 1, comprising:
a fuel tank support frame that connects both left and right side portions of a lower portion of the sorting unit frame, and protrudes outward to one side in the left-right direction of the vehicle body with respect to the main frame on one side in the left-right direction of the vehicle body among the left and right main frames,
wherein a fuel tank is mounted on and supported by the fuel tank support frame.

5. The combine harvester according to claim 1,
wherein a driving portion is provided in front of the threshing unit,
left and right vertically oriented frame bodies are provided on both left and right sides in a front end portion of the threshing frame,
a driving portion frame is provided in a state protruding forward in the vehicle body from the left and right vertically oriented frame bodies, and
the driving portion is mounted on and supported by the driving portion frame.

6. The combine harvester according to claim 1,
wherein traveling units are provided on both left and right sides of the vehicle body,
the front side traveling device and a rear side traveling device are provided in the left and right traveling units, and
the front portion of the left and right main frames is supported by the front side traveling device and a rear portion of the left and right main frames is supported by the rear side traveling device.

7. The combine harvester according to claim 6, comprising:
a rear side connection portion that connects a rear portion of the left and right main frames.

8. The combine harvester according to claim 7,
wherein the front side connection portion is provided on a forward side of the sorting unit, and the rear side connection portion is provided on a rearward side of the sorting unit.

9. The combine harvester according to claim 7,
wherein a front end portion of the sorting unit frame is connected to the front side connection portion.

10. The combine harvester according to claim 7,
wherein the front side connection portion is provided with a lower lateral frame configured to connect the left and right base portions on the lower side with respect to the left and right base portions, with a lower portion of the left and right base portions being supported on the left and right front side traveling devices.

11. The combine harvester according to claim 10,
wherein the vehicle body front portion is provided with a reaping transport unit that reaps planted grain culm and transports reaped grain culm to the threshing device,
the lower lateral frame is provided with left and right front-rear oriented connecting bodies that are connected to both left and right side portions of a front end portion of the sorting unit frame and extend forward in a front-rear direction, a rear side laterally oriented connecting body configured to connect a rear portion of the left and right front-rear oriented connecting bodies, and a front side laterally oriented connecting body configured to connect a front portion of the left and right front-rear oriented connecting bodies, and
an actuator capable of raising/lowering the reaping transport unit is supported on the front side laterally oriented connecting body.

12. The combine harvester according to claim 10,
wherein the transmission case is provided in a state in which the transmission case enters between the upper lateral frame and the lower lateral frame.

13. The combine harvester according to claim 12,
wherein the axle cases and the left and right relay transmission cases are provided on left and right sides of the transmission case, and
the left and right axle cases are configured to be respectively connected to the left and right base portions and are connected to the lower lateral frame.

14. The combine harvester according to claim 7,
wherein the rear side connection portion is provided with a rear connecting body that is positioned on the lower side with respect to the left and right main frames and extends across the left and right main frames, and
a traveling device support body provided across the left and right rear side traveling devices is supported by the rear connecting body so as to be swingable around a front-rear axis.

15. The combine harvester according to claim 1, comprising:
a grain tank that stores grain after the grain removal process in the threshing device, and an engine serving as a power source,
wherein above the threshing device, in a state where the grain tank is positioned on the front side of the vehicle body and the engine is positioned on the rear side of the vehicle body, the grain tank and the engine are provided in a state lined up in the front-rear direction, and
the grain tank and the engine are supported by left and right vertically oriented support portions erected from the left and right main frames in a state where the grain tank and the engine are provided widely in the front-rear direction of the vehicle body.

16. The combine harvester according to claim 15, comprising:
a threshing upper connecting body that connects an upper portion of the left and right vertically oriented support portions,
wherein the threshing upper connecting body is connected to a top plate of the threshing device.

17. The combine harvester according to claim 15, comprising:
a grain tank support frame that supports the grain tank, and an engine support frame that supports the engine,
wherein the grain tank support frame and the engine support frame extend across the left and right vertically oriented support portions, and are respectively supported by the left and right vertically oriented support portions.

18. The combine harvester according to claim 1,
wherein an engine serving as a power source, a radiator for engine cooling, and an exhaust treatment device that treats exhaust from the engine are provided in a state positioned above the threshing device,
when viewed in the front-rear direction of the vehicle body, the exhaust treatment device and the radiator are disposed separately on the left and right sides with respect to the engine, and the radiator is provided in a state protruding outward to one side in the left-right direction with respect to an end portion on one side in the left-right direction of the threshing device,
the exhaust treatment device is supported by the engine, and
the radiator is supported by the threshing device.

19. The combine harvester according to claim 1,
wherein the front side connection portion comprises:
a lower lateral frame configured to connect the left and right base portions on the lower side with respect to the left and right base portions,
wherein the lower lateral frame is located rearward of the upper lateral frame,
wherein the transmission case is provided between the upper lateral frame and the lower lateral frame.

* * * * *